United States Patent
Ichihara et al.

(10) Patent No.: US 11,079,656 B2
(45) Date of Patent: Aug. 3, 2021

(54) SUPERCONTINUUM SOURCE, METHOD FOR GENERATING AND EMITTING A SUPERCONTINUUM, MULTIPHOTON EXCITATION FLUORESCENCE MICROSCOPE, AND MULTIPHOTON EXCITATION METHOD

(71) Applicant: USHIO DENKI KABUSHIKI KAISHA, Tokyo (JP)

(72) Inventors: Akira Ichihara, Wako (JP); Akihiko Nakano, Wako (JP); Aiko Sawada, Tokyo (JP); Aya Ota, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/091,819

(22) PCT Filed: Apr. 4, 2017

(86) PCT No.: PCT/JP2017/014049
§ 371 (c)(1),
(2) Date: Oct. 5, 2018

(87) PCT Pub. No.: WO2017/175747
PCT Pub. Date: Oct. 12, 2017

(65) Prior Publication Data
US 2019/0129278 A1 May 2, 2019

(30) Foreign Application Priority Data

Apr. 5, 2016 (JP) .............................. JP2016-076155
Sep. 13, 2016 (JP) .............................. JP2016-178605

(51) Int. Cl.
*G01N 21/64* (2006.01)
*G02F 1/365* (2006.01)
(Continued)

(52) U.S. Cl.
CPC ......... *G02F 1/365* (2013.01); *G01N 21/6458* (2013.01); *G02B 21/16* (2013.01);
(Continued)

(58) Field of Classification Search
CPC ............ G02B 6/02214; G02B 6/02052; G01J 1/0425
See application file for complete search history.

(56) References Cited

U.S. PATENT DOCUMENTS

2003/0156605 A1* 8/2003 Richardson ......... H01S 3/06791
372/25
2007/0216993 A1* 9/2007 Aiso ................... H01S 3/06791
359/340

(Continued)

FOREIGN PATENT DOCUMENTS

JP 2008-216716 A 9/2008
JP 2015-511312 A 4/2015

OTHER PUBLICATIONS

Gao et al. "Ultraviolet-enhanced supercontinuum generation in uniform photonic crystal fiber pumped by giant-chirped fiber laser", Optics Express, vol. 22, No. 20, Oct. 6, 2014, pp. 24697-24705 (Year: 2014).*

(Continued)

*Primary Examiner* — David P Porta
*Assistant Examiner* — Mamadou Faye
(74) *Attorney, Agent, or Firm* — Studebaker & Brackett PC

(57) ABSTRACT

An ultrashort light pulse oscillated from an ultrashort pulse oscillator enters a waveguide (2) via a polarization control element (3). After conversion into a supercontinuum by a nonlinear optical effect, it is compressed by a prism pair compressor (71) as pulse compressor (7), and then emitted. The waveguide (2), which is a nonlinear fiber with normal dispersion in the wavelength range from 850 to 1550, (Continued)

generates the supercontinuum having a spectrum continuous in a wavelength band width of at least 200 nm included in the wavelength range from 850 to 1550 nm. The supercontinuum, which has a peak power within 1 to 100 kW, can be used as excitation light in a multiphoton excitation fluorescence microscope for fluorescence observation of biological samples.

16 Claims, 17 Drawing Sheets

(51) Int. Cl.
G02B 21/16 (2006.01)
G02F 1/35 (2006.01)
(52) U.S. Cl.
CPC .... G01N 2201/0697 (2013.01); G02F 1/3528 (2021.01); G02F 2201/02 (2013.01)

(56) References Cited

U.S. PATENT DOCUMENTS

| | | | |
|---|---|---|---|
| 2008/0205833 A1* | 8/2008 | Fu | A61B 1/00096 385/117 |
| 2012/0049092 A1 | 3/2012 | Tu et al. | |
| 2012/0099340 A1* | 4/2012 | Buchter | G02F 1/365 362/583 |
| 2013/0301663 A1* | 11/2013 | Clowes | H01S 3/11 372/6 |
| 2014/0058367 A1* | 2/2014 | Dantus | A61F 9/00802 606/6 |
| 2014/0367591 A1 | 12/2014 | Mahou et al. | |
| 2017/0082909 A1* | 3/2017 | Kung | G02F 1/353 |
| 2017/0093111 A1* | 3/2017 | Hooker | H01S 3/2316 |

OTHER PUBLICATIONS

Gopinath et al. "Highly Nonlinear Bismuth-Oxide Fiber for Supercontinuum Generation and Femtosecond Pulse Compression" Journal of Lightwave Technology, vol. 23, No. 11, Nov. 2005, pp. 3591-3596 (Year: 2005).*
Susumu Terakawa, "Basics and Recent Advancements n Multiphoon Excitation Microscopy", Japanese Journal of Optics, A Publication of the Optical Society of Japan, the Japan Society of Applied Physics 44(1), Jan. 2015, pp. 11-17.
John M. Dudley et al., "Cross-correlation frequency resolved optical gating analysis of broadband continuum generation in photonic crystal fiber: simulations and experiments", Optical Society of America, Oct. 21, 2002 / vol. 10, No. 21 / Optics Express, pp. 1216-1221.
Edmond B. Treacy, "Optical Pulse Compression With Diffraction Gratings", IEEE Journal of Quantum Electronics, vol. QE-5, No. 9, Sep. 1969, pp. 454-458.
R. L. Fork et al., "Negative dispersion using pairs of prisms", Optical Society of America, Optics Letters, vol. 9, No. 5, May 1984, pp. 150-152.
S. V. Chernikov et al., "Soliton pulse compression in dispersion-decreasing fiber", Optical Society of America, Optics Letters, vol. 18, No. 7, Apr. 1, 1993, pp. 476-478.
S. V. Chernikov et al., "Comblike dispersion-profiled fiber for soliton pulse train generation", Optical Society of America, Optics Letters, vol. 19, No. 8, Apr. 15, 1994, pp. 539-541.
Selcuk Akturk et al., "Extremely simple single-prism ultrashort-pulse compressor", Optical Society of America, Optics Express, vol. 14, No. 21, Oct. 16, 2006, pp. 10101-10108.
Ali Hussain Reshak, "Second Harmonic Generation Signal from Deep Shade Moisture Plants Using the Two-Photon Laser Scanning Microscope", IEEE,11th International Conference on Transparent Optical Networks Jun. 28, 2009, Tu. Al.4, pp. 1-4.
International Search Report issued in PCT/JP2017/014049; dated Jun. 27, 2017.
An Office Action; "Notice of Reasons for Refusal," issued by the Japanese Patent Office dated Mar. 3, 2020, which corresponds to Japanese Patent Application No. 2016-178605 and is related to U.S. Appl. No. 16/091,819; with English language translation.

* cited by examiner (1)

(2)

(1)

(2)

SUPERCONTINUUM SOURCE, METHOD FOR GENERATING AND EMITTING A SUPERCONTINUUM, MULTIPHOTON EXCITATION FLUORESCENCE MICROSCOPE, AND MULTIPHOTON EXCITATION METHOD

FIELD OF THE INVENTION

The invention of this application relates to generation of a supercontinuum, and relates to fluorescence microscopy.

TECHNICAL BACKGROUND

The phenomenon where a narrow-band ultrashort light pulse with high peak power is spectrally broadened by nonlinear optical effects is known as supercontinuum. Patent Documents 1-5 disclose known supercontinuum sources as prior art.

A source to generate and emit a supercontinuum (supercontinuum source) includes a pulse oscillator to oscillate ultrashort light pulses, and a nonlinear optical element. An ultrashort-pulse laser oscillator is often used as the pulse oscillator, and a waveguide type element such as nonlinear fiber is often used as the nonlinear optical element. When ultrashort light pulses oscillated from the pulse oscillator enter into the waveguide, it is spectrally broadened by nonlinear optical effects such as self-phase modulation, mutual phase modulation, four-wave mixing and Raman scattering, as it propagates through the waveguide, being emitted as a supercontinuum.

PRIOR-ART REFERENCES

Patent Documents

[Patent Document 1] JP, H10-90737, A
[Patent Document 2] JP, H11-174503, A
[Patent document 3] JP, 2003-149695, A
[Patent Document 4] JP, 2007-279704, A
[Patent Document 5] JP, 2008-216716, A
[Patent Document 6] JP, 2015-511312, A

Non-Patent Document

[Non-patent Document 1] Japanese Journal of Optics: a Publication of the Optical Society of Japan, the Japan Society of Applied Physics 44(1), 11-17, 2015-01

SUMMARY OF THE INVENTION

Problems to be Solved by the Invention

Expecting the practical application in optical communication mainly, researchers have been researching supercontinuums. To achieve higher transmission capacity, multicarrier (multiplex) transmission is required, and as a technique for this, adoption of a supercontinuum has been considered. The practical application of supercontinuums, however, has not shown much progress, due to developments of other techniques such as multi-core structured optical fibers.

Although the situation is as described, supercontinuums have spectral components in certain broadened ranges while characteristics as laser beams are retained, and because of these superior characteristics, supercontinuums are assumed to be preferably applicable in other fields.

The invention of this application was invented in consideration of these points, and has the object to provide a supercontinuum source emitting a supercontinuum usable in a new field.

Means for Solving the Problem

To achieve the described object, the invention according to aspect 1 of this application is a supercontinuum source to generate and emit a supercontinuum, comprising
a pulse oscillator oscillating an ultrashort light pulse, and
a waveguide converting the oscillated ultrashort light pulse from the pulse oscillator into a supercontinuum by a nonlinear optical effect, and then emitting,
wherein
the waveguide
converts the ultrashort light pulse into the supercontinuum having a spectrum continuous in a wavelength band width of at least 200 nm included in the wavelength range from 850 to 1550 nm, and
emits the supercontinuum enabling multiphoton excitation of an irradiated object on an irradiated plane.

Furthermore, to achieve the described object, the invention according to aspect 2 has the configuration where the pulse oscillator and the waveguide emit the supercontinuum with a peak power within 1 to 100 kW, in addition to the configuration in aspect 1.

Furthermore, to achieve the described object, the invention the according to aspect 3 has the configuration to emit the supercontinuum having the wavelength flatness within 3 dB in a band width of at least 200 nm included in the wavelength range from 850 to 1550 nm, in addition to the configuration according to aspect 1 or 2.

Furthermore, to achieve the described object, the invention according to aspect 4 has the configuration that the pulse oscillator oscillates the ultrashort light pulse having a pulse width not more than 1 ps and a center wavelength in the wavelength range from 1000 to 1100 nm, in addition to the configuration according to aspect 1, 2 or 3.

Furthermore, to achieve the described object, the invention according to aspect 5 has the configuration that the waveguide converts the ultrashort light pulse into the supercontinuum where the temporal shift of wavelength is continuous, in addition to the configuration according to aspect 1, 2, 3 or 4.

Furthermore, to achieve the described object, the invention according to aspect 6 has the configuration that the waveguide is a fiber with normal dispersion in the wavelength range from 850 to 1550 nm, in addition to the configuration according to aspect 1, 2, 3, 4 or 5.

Furthermore, to achieve the described object, the invention according to aspect 7 has the configuration that the center wavelength of the ultrashort light pulse is in the range of plus and minus 50 nm to the peak wavelength of the group velocity dispersion spectrum of the fiber with normal dispersion, in addition to the according to aspect 6.

Furthermore, to achieve the described object, the invention according to aspect 8 further comprising a pulse compressor to increase the peak power of the supercontinuum by compressing the supercontinuum emitted from the waveguide, in addition to the configuration according to aspects 1, 2, 3, 4 or 5.

Furthermore, to achieve the described object, the invention according to aspect 9 has the configuration comprising a pulse compressor to increase the peak power of the supercontinuum by compressing the supercontinuum emitted from the waveguide, in addition to the configuration in the aspect 6 or 7.

Furthermore, to achieve the described object, the invention according to aspect 10 is a supercontinuum source to generate and emit supercontinuum, comprising a pulse oscillator oscillating an ultrashort light pulse, and a waveguide that converts the oscillated ultrashort light pulse from the pulse oscillator into a supercontinuum by a nonlinear optical effect and then emits wherein the waveguide converts the ultrashort light pulse into the supercontinuum having a spectrum continuous in a band width of at least 200 nm included in the wavelength range from 850 to 1550 nm, and a pulse compressor is provided to increase the peak power of the supercontinuum emitted from the waveguide by pulse compression thereof.

Furthermore, to achieve the described object, the invention according to aspect 11 is a method for generating and emitting a supercontinuum, comprising oscillating an ultrashort light pulse by a pulse oscillator, making the ultrashort light pulse from the pulse oscillator enter into a waveguide, and converting the ultrashort light pulse into a supercontinuum by a nonlinear optical effect in the waveguide, and then emitting therefrom, wherein the waveguide converts the ultrashort light pulse into the supercontinuum having a spectrum continuous in a band width of at least 200 nm included in the wavelength range from 850 to 1550 nm, and emits the supercontinuum capable of multiphoton excitation of an object on an irradiated plane.

Furthermore, to achieve the described object, the invention according to aspect 12 further comprises emitting the supercontinuum with a peak power within 1 to 100 kW, in addition to the configuration according to aspect 11.

Furthermore, to achieve the described object, the invention according to aspect 13 further comprises emitting the supercontinuum having the wavelength flatness within 3 dB in a band width of at least 200 nm included in the wavelength range from 850 to 1550 nm, in addition to the configuration according to 11 or 12.

Furthermore, to achieve the described object, the invention according to aspect 14 has the configuration where the ultrashort light pulse oscillated from the pulse oscillator has a pulse width not more than 1 ps and the center wavelength in the wavelength range from 1000 nm to 1100 nm, in addition to the configuration according to aspect 11, 12 or 13.

Furthermore, to achieve the described object, the invention according to aspect 15 has the configuration where the waveguide converts the ultrashort light pulse into the supercontinuum where the temporal shift of wavelength is continuous, in addition to the configuration according to aspect 11, 12, 13 or 14.

Furthermore, to achieve the described object, the invention according to aspect 16 has the configuration where the waveguide is a fiber with normal dispersion in the wavelength range from 850 to 1550 nm, in addition to the configuration in the aspect 11, 12, 13, 14 or 15.

Furthermore, to achieve the described object, the invention according to aspect 17 has the configuration where the center wavelength of the ultrashort light pulse is in the range of plus and minus 50 nm to the peak wavelength of the group velocity dispersion spectrum of the fiber with normal dispersion, in addition to the configuration according to aspect 16.

Furthermore, to achieve the described object, the invention according to aspect 18 further comprises increasing the peak power of the supercontinuum emitted from the waveguide by pulse compression thereof, in addition to the configuration according to aspect 11, 12, 13, 14 or 15.

Furthermore, to achieve the described object, the invention according to aspect 19 further comprises increasing the peak power of the supercontinuum emitted from the waveguide by pulse compression thereof, in addition to the configuration according to aspect 16 or 17.

Furthermore, to achieve the described object, the invention according to aspect 20 is a method for generating and emitting a supercontinuum, comprising oscillating an ultrashort light pulse by a pulse oscillator, making the ultrashort light pulse from the pulse oscillator enter into a waveguide, and converting the ultrashort light pulse into a supercontinuum by a nonlinear optical effect in the waveguide, and then emitting therefrom, wherein the waveguide converts the ultrashort light pulse into the supercontinuum having a spectrum continuous in a band width of at least 200 nm included in the wavelength range from 850 to 1550 nm, and the peak power of the supercontinuum is increased by compressing the supercontinuum emitted from the waveguide.

Furthermore, to achieve the described object, the invention according to aspect 21 is a multiphoton excitation fluorescence microscope comprising the supercontinuum source according to aspect 1, 2, 3, 4, 5, 6, 7, 8, 9 or 10, further comprising an optical system to irradiate an object with the supercontinuum emitted from the waveguide, and a detector to detect a fluorescence emitted when the object is subjected to multiphoton excitation by the supercontinuum.

The invention according to aspect 22 is a multiphoton excitation method for causing multiphoton excitation on a fluorescent substance by a supercontinuum, comprising an oscillation step where an ultrashort light pulse is oscillated by a pulse oscillator, a conversion step where the ultrashort light pulse oscillated from the pulse oscillator is made enter into the waveguide, converted into the supercontinuum by a nonlinear optical effect in the waveguide, and then emitted, a compression step where the peak power of the emitted supercontinuum is increased by pulse compression, and an irradiation step where all or a part of the supercontinuum which peak power has been increased in the compression step is applied to the fluorescent substance to cause multiphoton excitation, wherein the conversion step is the step where the ultrashort light pulse is converted in the waveguide into the supercontinuum having a spectrum continuous in a band width of at least 200 nm included in the wavelength range from 850 to 1550 nm.

Effect of the Invention

As described later, according to the invention as according to aspect 1 or 11, the source can be used preferably for fluorescence observation, measurement, and the like utilizing multiphoton excitation, because it emits a supercontinuum having a spectrum continuous in a band width at least 200 nm included in the wavelength range from 850 to 1550 nm, and the supercontinuum enables multiphoton excitation of an object.

According to the invention according to aspect 2 or 12, moreover, the source can be used preferably for fluorescence observation of biological samples, because the peak power is within 1 to 100 kW.

According to the invention according to aspect 3 or 13, moreover, the source is more widely usable because of the wavelength flatness within 3 dB.

According to the invention according to aspect 4 or 14, moreover, the high wavelength flatness can be easily achieved.

According to the invention according to aspect 5 or 15, moreover, because a linear chirp supercontinuum is generated, the characteristic is applicable to various uses.

According to the invention according to aspect 6 or 16, moreover, it is easy to generate a supercontinuum in the wavelength range of 850-1550 nm, or to generate a supercontinuum with higher peak power.

According to the invention according to aspect 7 or 17, moreover, it is possible to obtain a linearly chirped supercontinuum more easily, because the center wavelength of the ultrashort light pulse is within the range ±50 nm from the peak dispersion wavelength in the group velocity dispersion spectrum of the fiber with normal dispersion.

According to the invention according to aspect 8, 10, 18 or 20, moreover, it is possible to obtain a supercontinuum with high peak power, because the peak power of the supercontinuum emitted from the waveguide is increased by pulse compression.

According to the invention according to aspect 9 or 19, moreover, it is possible to obtain a supercontinuum with high peak power, because the peak power of the supercontinuum emitted from the waveguide is increased by pulse compression. In this, it is possible to carry out the compression more easily, because the supercontinuum is made linearly chirped by the fiber with normal dispersion and then subjected to the compression.

According to the invention according to aspect 21, moreover, one laser enables multiphoton excitation simultaneously on two or more kinds of fluorescent proteins having different absorption wavelengths in the wavelength range from 850 to 1550 nm. Providing a wavelength tuning mechanism, of course it is also possible to extract light at a desired wavelength to observe fluorescence by monochromatic multiphoton excitation. Whereas simultaneous polychromatic excitation needed two or more lasers conventionally, it is possible to present a space-saving widely-usable multiphoton excitation fluorescence microscope according to the invention.

EMBODIMENTS OF THE INVENTION

Figure 1:
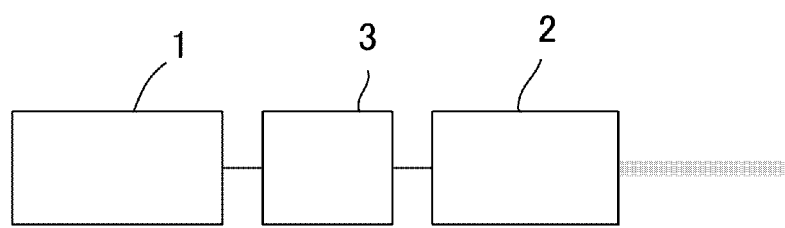
FIG. 1 is a schematic view of a supercontinuum source in a first embodiment.

Embodiments of the present invention are described as follows. FIG. 1 is a schematic view of the supercontinuum source in the first embodiment. Operation of the supercontinuum source in the embodiment is included in the following description. This corresponds to description on a supercontinuum generation method in an embodiment of the invention.

The major feature of the supercontinuum source in this embodiment is that it emits a supercontinuum with the photon density not less than the minimum density capable of multiphoton excitation of an object. That is, the supercontinuum source in the embodiment is configured as a light source for multiphoton excitation.

A multiphoton excitation fluorescence microscope is assumed as a preferable application of this supercontinuum source.

Fluorescent microscopy is the type of microscopy where an object is observed by catching fluorescent emission from the object irradiated to excitation light. It has been the important technique especially in such fields as biotechnology research and biological sample observation. Fluorescent microscopes have the features that only a part of an object can be observed by dying it, and that the activity of a cell can be observed as alive.

In these years, the technique of two-photon excitation fluorescence microscopy has been developed in fluorescence microscopy. While fluorescence emission by light excitation is usually caused with absorption of one photon into a molecule, two photons are simultaneously absorbed to excite and then causes a fluorescence in the two-photon excitation. Theoretically it is possible to make three or more photons absorbed simultaneously for excitation. The fluorescent microscopy making two or more photons absorbed simultaneously for excitation is called multiphoton excitation fluorescence microscopy. The detailed configuration of a multiphoton excitation fluorescence microscope is disclosed in Non-patent Document 1 for instance.

The multiphoton excitation microscopy is advantageous in several points compared to other kinds of fluorescence microscopy. One of those is capability of easy wavelength separation. In fluorescence microscopy, it is required to separate a fluorescence from light at the excitation wavelength to observe only the fluorescence. The wavelength of a fluorescence, however, is often close to the excitation wavelength, being difficult to separate, in the normal fluorescence microscopy, i.e., one photon excitation fluorescence microscopy. Such an element as sharp-cut filter may be used to eliminate the excitation light to extract only a fluorescence. However, the wavelength band of a fluorescence often overlaps with the wavelength band of the excitation light, and the fluorescence might often be eliminated in eliminating the excitation light. As a result, it is impossible to catch the fluorescence with sufficient intensity.

In two-photon excitation, on the other hand, the separation is made easier by such an element as sharp-cut filter, and it is possible to observe a fluorescence without losing, because the excitation wavelength is two times longer than the wavelength of the fluorescence.

Another advantage of the multiphoton excitation fluorescence microscopy is that fluorescence observation is enabled at any position in depth direction. In multiphoton excitation, two or more photons need to collide with a fluorescent molecule within a very short period (approximately $10^{-16}$ seconds, substantially at the same time), and therefore a very high photon density is required. When excitation light is concentrated in an object transparent to the excitation light to some extent, therefore, multiphoton excitation is caused only at the concentration point, and thus only the fluorescence emission at the point can be observed. Moreover, shift of the concentration position enables observation at any desired position in the depth direction. It consequently has the pinhole effect as in confocal microscopes, causing no loss of fluorescence emission either because no pinhole is required. This is the merit thereof especially, for instance, when the inside of a biological sample is to be observed.

To achieve multiphoton excitation, it is necessary to increase photon density temporally and spatially. Therefore, an ultrashort pulse laser oscillator, which emits a pulse of light within a very short period, e.g., femtosecond order, is employed as a light source. Total power generated on the laser oscillator is concentrated in a short period, thereby achieving a high photon density required for multiphoton excitation.

Due to some problems, the multiphoton excitation fluorescence microscopy as described has not spread widely, only being partly put to practical use. One reason of this is that degree of freedom in the observation condition is extremely low.

As well known, depending on fluorescent molecules, excitation wavelength is different, and wavelength of fluorescence emission is also different. In observing a different kind of samples, therefore, it is necessary to irradiate them to excitation light at a different wavelength in almost all cases. For conventional multiphoton excitation fluorescence microscopes, because ultrashort pulse laser oscillators with different emission wavelengths are needed to apply excitation lights at different wavelengths, one ultrashort pulse laser oscillator is needed logically for each kind of fluorescent molecules to observe. As well known, ultrashort-pulse laser oscillators are very expensive devices, and therefore it is far beyond the feasible range to prepare each individual ultrashort pulse laser oscillator for each different kind of fluorescent molecules.

Patent Document 6 discloses a multiphoton excitation fluorescence microscope that employs a couple of ultrashort pulse laser oscillators to observe three different-kind fluorescent molecules. According to this disclosure, though the number of the ultrashort pulse lasers can be less than the number of kinds of fluorescent molecules to observe, a couple of ultrashort pulse laser oscillators are still necessary, and thus the higher cost is not a small problem.

In the multiphoton excitation fluorescence microscope in Patent Document 6, moreover, it is necessary to overlap temporally and spatially ultrashort pulse laser beams from the couple of ultrashort pulse laser oscillators within the concentration spot. Requiring a much-complicated large-in-scale mechanism and control system, it raises the problem of difficulty in the adjustment work in addition to the cost problem.

Some practically usable multiphoton excitation fluorescence microscopes employ the configuration where a wavelength tuning mechanism is installed to an ultrashort pulse laser oscillator, i.e., tunable laser configuration. This kind of tuning mechanism, however, uses a nonlinear optical element such as OPO (optical parametric oscillator), having the problem of requiring a troublesome work for wavelength adjustment such as phase matching.

The inventor assumed that each described problem for multiphoton excitation fluorescence microscopes could be solved by adopting supercontinuum, and diligently carried out a research. The supercontinuum source in the embodiment is based on the result of this research.

Concretely, the supercontinuum source in the embodiment shown in FIG. 1 includes a pulse oscillator 1 oscillating ultrashort pulses of light, and a waveguide 2 to cause a nonlinear optical effect. An ultrashort pulse laser is used for as the pulse oscillator 1. This ultrashort pulse laser oscillates ultrashort pulses of the femtosecond order, and preferably the pulse width is 1 ps (picosecond) or less. The center wavelength of the ultrashort pulse laser is preferably within about 1000-1100 nm. Specifically, it may be an ultrashort pulse fiber laser employing a rare-earth, e.g., Yb, doped fiber, or ultrashort pulse laser employing a Yb-based crystal, e.g., Yb:KYW excited by a laser diode.

The waveguide 2 is to generate a supercontinuum from the ultrashort light pulse by a nonlinear optical effect, i.e., nonlinear waveguide. In this embodiment, an optical fiber is used as the waveguide 2, which is preferably a highly nonlinear fiber. The nonlinear fiber as the waveguide 2 may be a loop-shaped flexible one, or rod-shaped one. In this embodiment, a polarization control element 3 is provided between the pulse oscillator 1 and the waveguide 2. The polarization control element 3 is to enhance the nonlinear optical effect on the waveguide 2, and to make the ultrashort pulses of light polarized according to the characteristics of the waveguide 2 before entering thereto. A wavelength plate, e.g., ½- or ¼-wavelength plate, is used as the polarization control element 3. In this embodiment, the polarization control element 3 makes the ultrashort pulses of light linearly polarized in a desired direction according to the characteristic of the waveguide 2. Linear polarization is just an example, not limiting the invention.

The supercontinuum source in this embodiment is the one to emit a supercontinuum having a spectrum continuous within a band at least 200 nm included in the wavelength range of 850-1550 nm. The supercontinuum source in this embodiment also emits a supercontinuum which temporal peak power is preferably 1 kW or more. These points are described with a more specific example.

Figure 2:
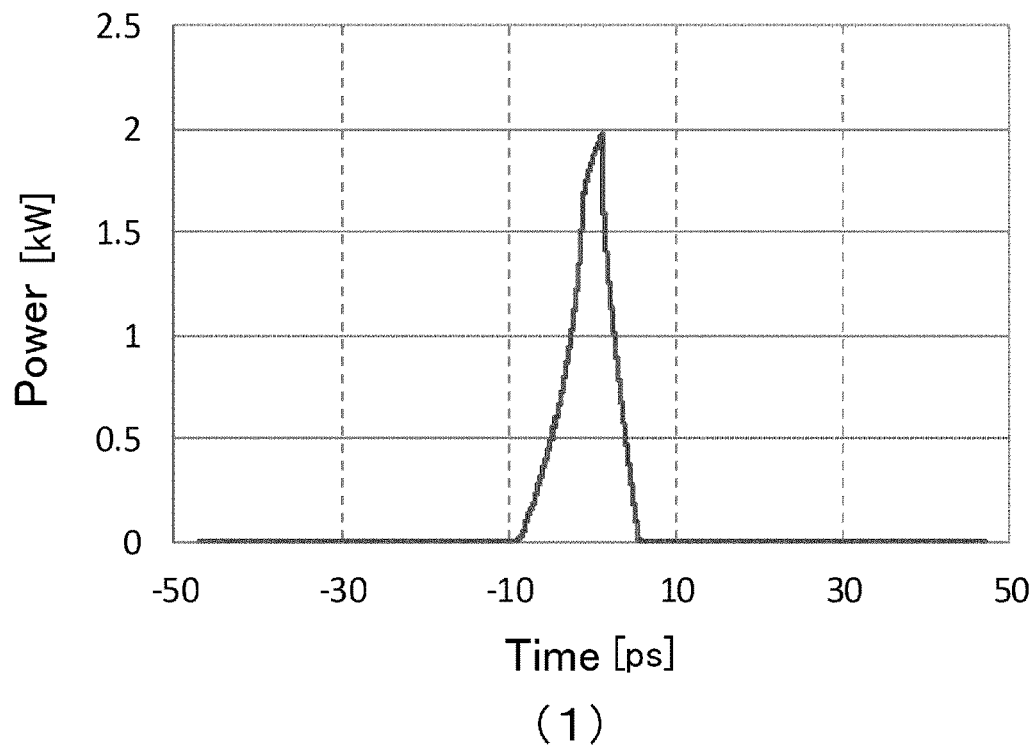
FIG. 2 is the figure showing an analysis result by a spectrum analyzer for light emitted from an example of the supercontinuum source shown in FIG. 1 (Example 1).
Figure 2:
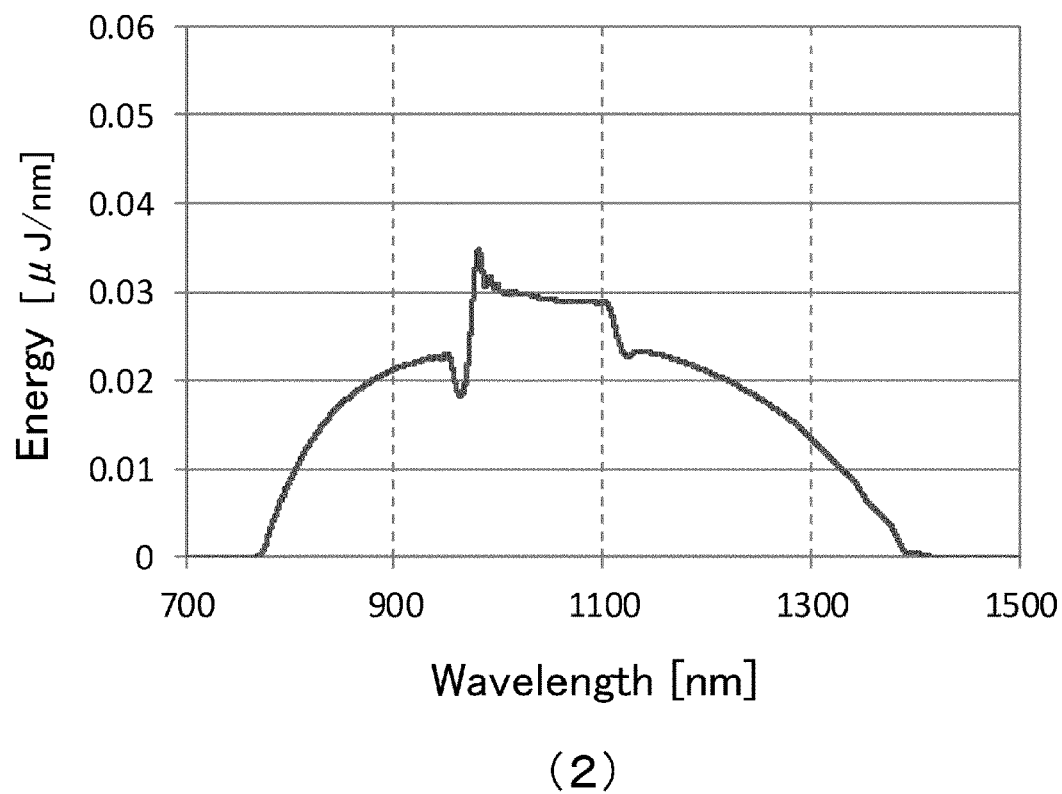

FIG. 2 is the figure showing an analysis result by a spectrum analyzer for light emitted from the supercontinuum source in the embodiment shown in FIG. 1 (Example 1). FIG. 2(1) is the figure showing a pulse shape, i.e., variation of emission intensity (wavelength-integrated intensity) as time passes. FIG. 2(2) is the figure showing the spectral distribution of the emitted light with the pulse shape of (1), which is energy per wavelength at each wavelength in one pulse.

This example employs a pulse laser having a Yb-base crystal emitting light pulses of 1045 nm in the center wavelength and 200 fs in the pulse width, as the pulse oscillator 1. As shown in FIG. 2(1), the temporal peak power of a light pulse emitted from the waveguide 2 is approximately 2 kW. As shown in FIG. 2(2), the emitted light pulse is continuous within the range of about 800-1400 nm, and thus supercontinuum generation was confirmed.

In the supercontinuum source in the embodiment, wavelength flatness of the supercontinuum emission is 3 dB or less. The wavelength flatness means intensity uniformity among spectral components, in other words, smallness of spectral intensity unevenness. "3 dB or less" means that intensity at the highest-intensity wavelength is within 3 dB to the intensity at the lowest-intensity wavelength. As shown in FIG. 2(2), the supercontinuum by the supercontinuum source in Example 1 has the intensity unevenness within 3 dB in the range about 850 to 1250 nm.

Figure 3:
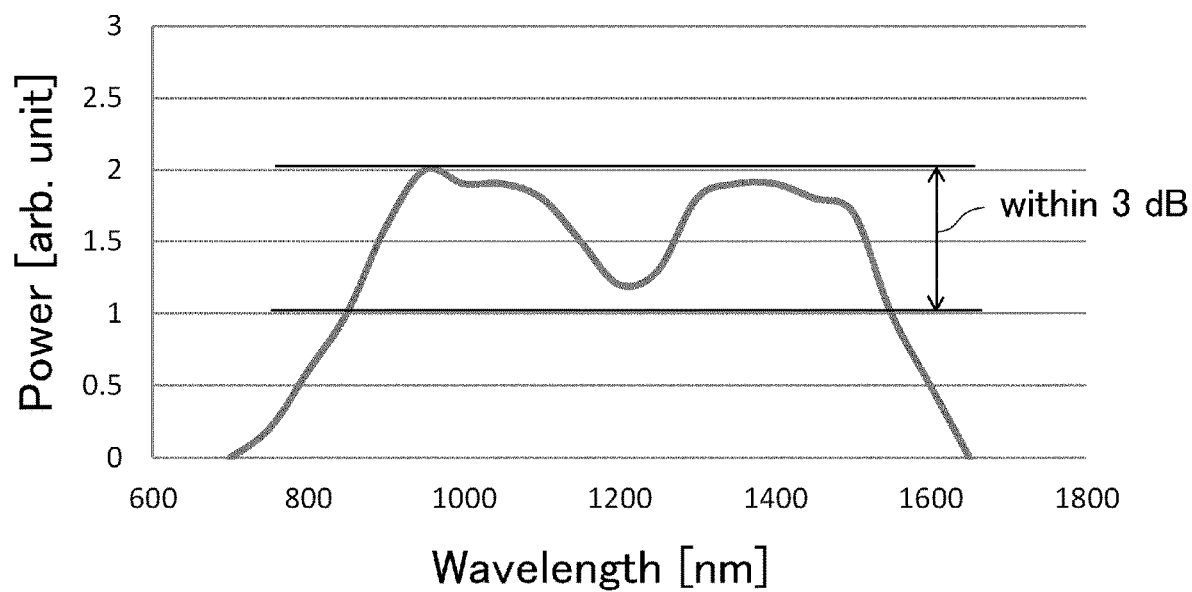
FIG. 3 is the figure showing other analysis results for lights emitted from supercontinuum generation sources as other examples (Example 2 and Example 3).
Figure 3:
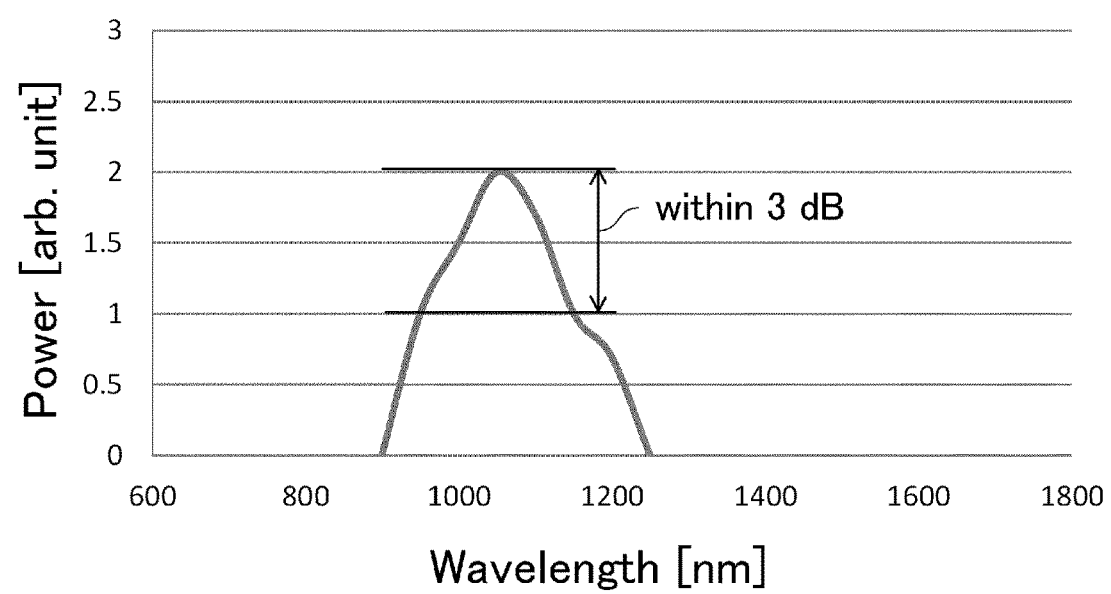

The within-3 dB wavelength flatness is described in more detail with other examples. FIG. 3 is the figure showing analysis results of lights emitted from supercontinuum sources as other two examples (example 2 and example 3).

FIG. 3(1) shows Example 2 where an optical parametric amplified system (OPA) of 1100 nm in the center wavelength and 1 ps in the pulse width was employed for the pulse oscillator 1. In this example, the wavelength flatness within 3 dB in the wavelength range about 850-1550 nm was obtained.

FIG. 3(2) further shows Example 3 where a Yb-doped fiber laser oscillator of 1030 nm in the center wavelength and 170 fs in the pulse width 170 was employed for the pulse oscillator 1. In this example as well, the wavelength flatness within 3 dB in the wavelength range about 950-1150 nm was obtained.

The described superior performance of the supercontinuum source in the embodiment, that is, the high wavelength flatness, is much affected by the characteristics of the waveguide 2. This point is described as follows.

Figure 4:
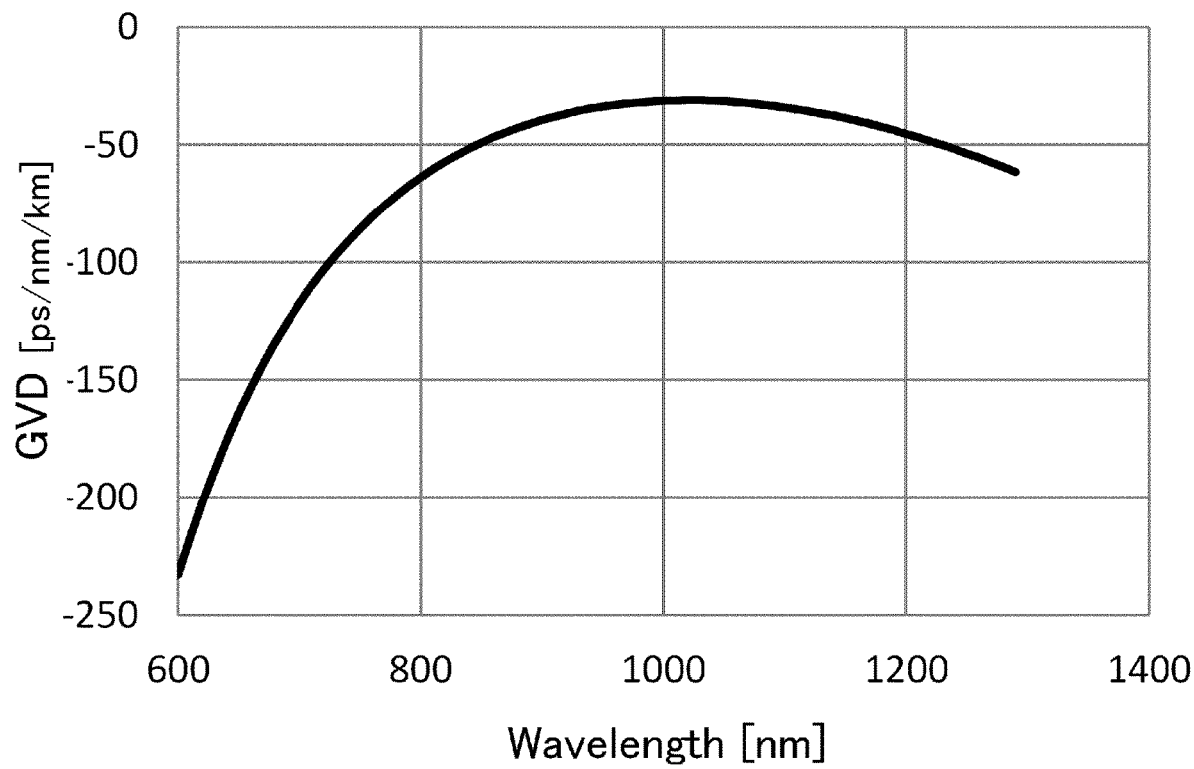
FIG. 4 is the figure showing the spectral dispersion characteristic of a waveguide provided in the supercontinuum source in the embodiment.

As the waveguide 2, the supercontinuum source in the embodiment employs a nonlinear fiber with normal dispersion in the range of emission wavelengths. FIG. 4 is the figure showing the spectral dispersion characteristic of the waveguide 2 for the supercontinuum source in the embodiment.

In the field of optical communication, it is important to reduce group velocity dispersion (GVD), which is one of fundamental characteristics for optical fibers. Conversely, a nonlinear optical fiber used for supercontinuum generation enhances group velocity dispersion by a nonlinear optical effect, and thereby broadens a band width. As group velocity dispersion characteristics, normal dispersion and anomalous dispersion are known.

In these, the nonlinear fiber used as the waveguide 2 in the embodiment has normal dispersion as shown in FIG. 4. That is, GVD of this waveguide 2 is negative within the range of 800-1600 nm. The nonlinear fiber in this example has the maximum GVD, which is approximately −30 ps/nm/km, at around 1000-1100 nm. Such a nonlinear fiber is being sold as NL-1050-NEG-1 by NKT Photonics A/S, Denmark, being available therefrom. In Example 1, length of the nonlinear fiber used as the waveguide 2 is 500 mm.

Using the waveguide 2 with normal dispersion in the emission wavelength range as described, the supercontinuum has preferable wavelength components with neither spectral vacancy nor extreme spikes (ultra-narrow-band intense waves). The following is the description on the result of a comparative experiment where this point was confirmed.

In this experiment, a nonlinear fiber not having normal dispersion in the wavelength range of 850-1550 nm was used as the waveguide 2 instead of the nonlinear fiber used in described Example 1, and similarly a supercontinuum was generated to analyze the spectrum thereof. Conditions other than use of the nonlinear fiber not having normal dispersion were the same as in Example 1. "Not having normal dispersion in the wavelength range of 850-1550 nm" means that dispersion is anomalous in a part or all of the wavelength range of 850-1550 nm.

Figure 5:
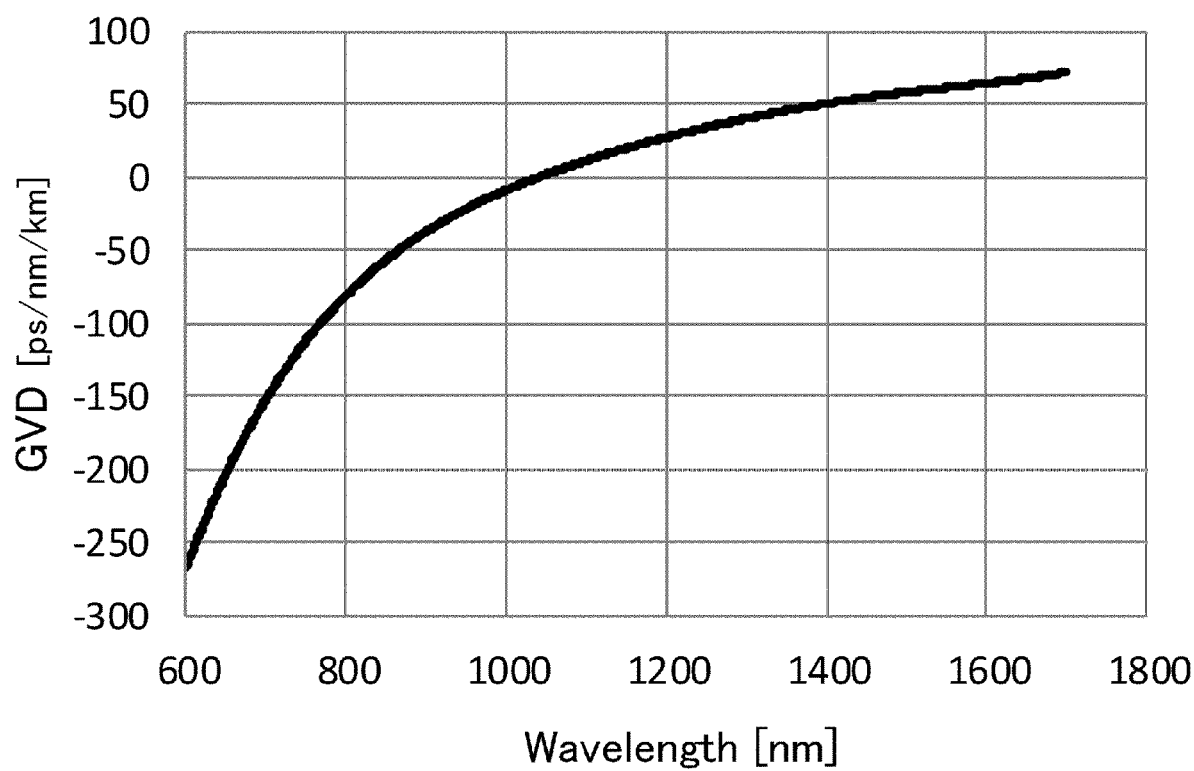
FIG. 5 is the figure showing the spectral dispersion characteristic of a nonlinear fiber used as the waveguide in a referential example.

FIG. 5 is the figure showing the spectral dispersion characteristic of the nonlinear fiber used as the waveguide 2 in the referential example. As show in FIG. 5, GVD of the nonlinear optical fiber used as the waveguide 2 in the referential example is positive (anomalous) in the wavelength range longer than 1040 nm. More specifically, a nonlinear fiber SC-5.0-1040 sold by NKT Photonics A/S was used for the waveguide 2 in the referential example. This fiber was 1000 mm in length.

Figure 6:
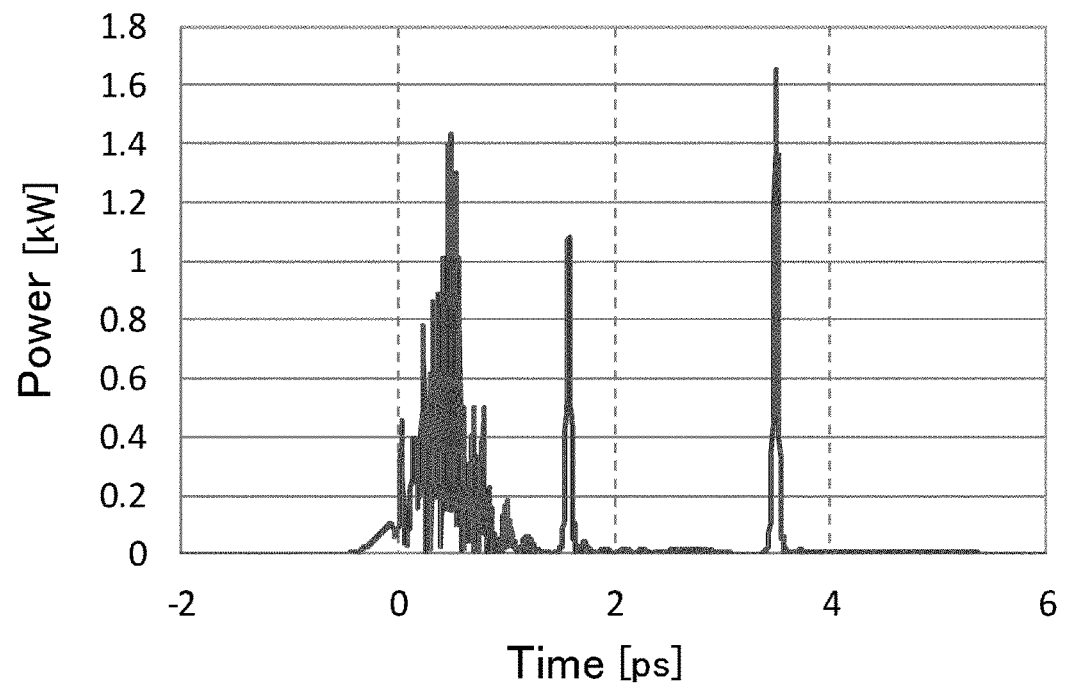
FIG. 6 is the figure showing an analysis result of the spectrum of a supercontinuum generated on the configuration of the referential example.
Figure 6:
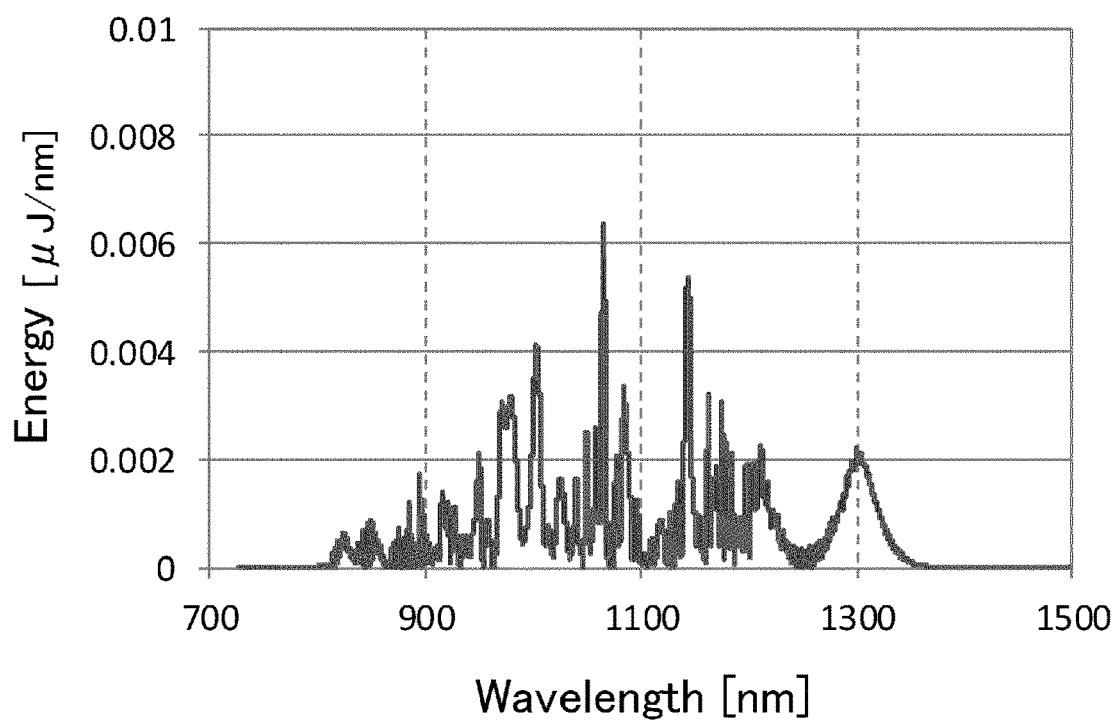

FIG. 6 is the figure showing the analysis result for the spectrum of a supercontinuum generated in the referential example. As well as FIG. 2, FIG. 6(1) shows variation of emission intensity (wavelength-integrated intensity) as time passes, and FIG. 6(2) is the figure showing time-integrated energy per wavelength at each wavelength in one pulse.

In the referential example, as shown in FIG. 6(2), the observed spectrum of the supercontinuum includes a lot of spike-shaped peaks, not being a flat distribution. That is, the wavelength flatness of 3 dB or less is not achieved in at least 950-1150 nm. The reason of this is supposedly as follows. Because GVD is positive, the propagation velocity of a longer wavelength wave, which has generated initially (early) in an ultrashort pulse, is delayed, and the propagation velocity of a shorter wavelength wave, which has generated later therein, is enhanced. As a result, nonlinear optical effects such as self-steepening, induced Raman scattering and optical soliton are caused. Thus, the spectrum of the supercontinuum may include a lot of spikes as shown in FIG. 6(2), though it has become wider in the wavelength band. As shown in FIG. 2(2), by contrast, the supercontinuum having the high wavelength flatness with no spike noises is obtained when the nonlinear fiber with normal dispersion is used as the waveguide 2.

As described, the supercontinuum source in the embodiment can be preferably used for fluorescence observation and measurement of an object utilizing multiphoton excitation, because the supercontinuum is continuous in at least 200 nm band width included in the wavelength range from 850 to 1550 nm, and because the supercontinuum is capable of carrying out multiphoton excitation on an object.

Moreover, because of the wavelength flatness within 3 dB, the source is available for wider uses. In addition, since the nonlinear fiber with normal dispersion is used as the waveguide 2, the high wavelength flatness can be easily obtained. When a nonlinear fiber not having normal dispersion is used as the waveguide 2, it is necessary to control or adjust higher-order nonlinear optical effects to obtain the high wavelength flatness. However, this is very difficult.

The point that the pulse oscillator emits ultrashort light pulses of 1000 to 1100 nm in the center wavelength and 1 ps in the pulse width brings about the effects that a supercontinuum can be easily generated in the wavelength band of 850-1550 nm, and that a supercontinuum having the high peak power can be easily generated. That is, when the pulse width of the ultrashort light pulses is longer than 1 ps, the supercontinuum cannot have a wide-band spectrum. When the center wavelength of the ultrashort light pulses is in the range of 1000-1100 nm, the supercontinuum easily can have a spectrum broadened over at least 200 nm in the range of 850-1550 nm by a nonlinear optical effect.

A multiphoton excitation fluorescence microscope according to an embodiment of the invention is described next.

Figure 7:
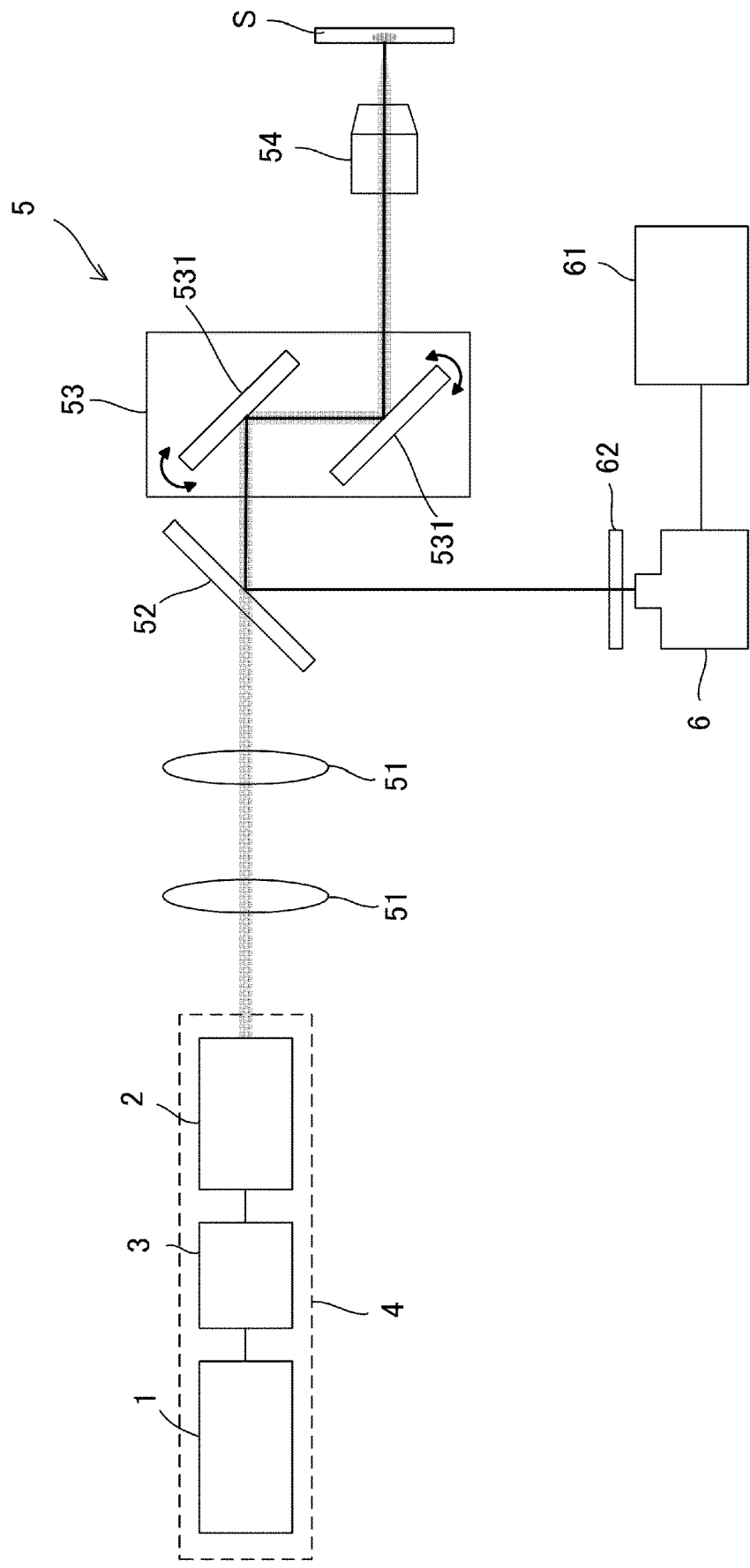
FIG. 7 is a schematic view of a multiphoton excitation fluorescence microscope in an embodiment.

FIG. 7 is a schematic view of the multiphoton excitation fluorescence microscope in the embodiment. The multiphoton excitation fluorescence microscope shown in FIG. 7 includes a supercontinuum source 4, an optical system 5 to irradiate an object S with a supercontinuum emitted from the supercontinuum source 4, and a detector 6 to detect a fluorescence emitted from the object S excited by the supercontinuum irradiation. The supercontinuum source 4 is the described one having the pulse oscillator 1, the polarized-light control element 3, and the waveguide 2.

The optical system 5 includes several lenses 51, a dichroic mirror 52, a scanning mirror unit 53, and an objective lens 54 in this embodiment. The lenses 51 are disposed to modify the beam pattern of the emitted supercontinuum and/or to change the beam size thereof. The dichroic mirror 52 is disposed to separate the supercontinuum as excitation light and a fluorescence emitted by the excitation.

The objective lens 54 is disposed to concentrate the supercontinuum to the object S. In particular, the objective lens 54 is capable of concentrating the supercontinuum to a desired depth position in the object S that could be a biological sample.

The multiphoton excitation fluorescence microscope in the embodiment is a kind of laser scanning microscopes, including the scanning mirror unit 53 to scan the light concentration point on an observation plane vertical to the optical axis. The scanning mirror unit 53 further includes a pair of scanning mirrors 531, to which a drive mechanism (not shown in the figure) is provided to change the posture of each scanning mirror 531 independently. The light concentration point by the objective lens 54 is scanned on an X-Y plane vertical to the optical axis when the drive mechanism drives each scanning mirror 531.

A photo-multiplier or avalanche photodiode, etc. is used as the detector 6. The imaging device 61 is the device that memorizes the output from the detector 6, obtain a 2D image therefrom or 3D image by overlaying 2D images, and displays the image as an observation result.

The imaging device 61 memorizes the output from the detector 6 in a memory (RAM) synchronously with the scanning by the scanning mirror unit 53. The output includes each intensity signal of fluorescence emitted from each concentration point. Thus, an image is visualized in one frame with the contrast corresponding to the intensity signals. When the objective lens 54 is operated to change the light concentration point, because it is on another observation plan, a 3D observation image is made by memorizing it as new image data and integrating it with other image data on other observation planes. So as to carry out the data processing as described, the imaging device 61 includes a processor and a program executable by the processor, and includes a display to display the images.

A filter 62 to extract only a fluorescence to observe is disposed on the optical path at the incident side to the detector 6. The filter 62 may be a sharp cut filter, band-bus filter or the like.

A pinhole board may be disposed on the optical path at the incident side to the detector 6. The pinhole is located at the focus by the objective lens 54 as well as the object S, i.e., made confocal, establishing the configuration of so-called confocal laser scanning microscope. This solution enables to obtain a clear image where noises in the depth direction are eliminated.

In the multiphoton excitation fluorescence microscope in the embodiment, the supercontinuum source 4 enables observation of multiphoton-excited fluorescence in an object. This point is described as follows.

Whether observation of multiphoton-excited fluorescence is possible or not is whether a fluorescence can be emitted by multiphoton excitation, and whether it has a sufficient intensity for observation (i.e., for imaging) on a microscope. Accordingly it depends on the photon density of excitation light in the end. Actually, because the objective lens 54 concentrates excitation light to one point, which corresponds to one pixel in imaging, it is whether the number or density of photons at the point is not less than the amount capable of multiphoton-excited fluorescence observation. Though theoretically excitation by three or more photons is possible, two-photon excitation is taken.

In the following description, excitation of EGFP (enhanced green fluorescent protein) by light having the wavelength of 1000 nm is taken as an example.

Showing the condition of EGFP as object S, the EGFP density (expression density) in a cell is assumed to be $1 \times 10^{-5}$M, and refractive index of a solution in which the cell including EGFP is dipped is assumed to be 1.47. Quantum efficiency of EGFP is assumed to be 0.6.

On the other hand, capability of multiphoton-excited fluorescence observation means that a fluorescence (usually having the wavelength half of the excitation light) by multiphoton excitation is caught on the detector 6, and converted into electric signals making an observable image. Therefore, it is necessary to consider the conditions of the optical system 5 and the detection system.

The size of an X-Y plane (observation plane) in which the scanning mirror unit 53 carries out the scanning is assumed to be, for example, 512×512 pixels. This means excitation light is concentrated at each of 512×512 points to emit a fluorescence by two-photon excitation. In this, the size of one pixel, which corresponds to the beam diameter at the light concentration point by the objective lens, is assumed to be 1 μm in diameter. The number of gray levels (grayscale) at each pixel, which affects the number of photons necessary, is assumed to be 12 bits.

How long one point should be irradiated to excitation light depends on how long the frame period is, i.e., length of the period where one frame with 512×512 pixels for one observation plane is observed. Though the frame period is preferably short when motion of a biological sample is observed, fluorescence observation could not be carried out sufficiently in a shorter frame period, because only the smaller amount of fluorescence is emitted from one point to be caught on the detector 6. In consideration of these, the frame rate is assumed to be, for example, 5 fps (i.e., five frames per second).

Showing conditions of the optical system 5 and the detection system, 30% of light emitted from the supercontinuum source 4 is assumedly collected by the optical system 5 for irradiation of EGFP, and photoelectric conversion efficiency of the photo-multiplier used as the detector 6 is assumed to be 40%.

Though the specific calculating formulae are omitted, the number of photons needed at one pixel (one light concentration point by the objective lens 54) was calculated to be 8192 according to the described conditions.

On the other hand, if it is assumed that a 1 kW-output supercontinuum source 4 is used under the described conditions, the number of effective photons was 10112. In this, the effective photons means photons that are applied to EGFP, causes fluorescence and are caught in the detector 6, i.e., converted into an electric signal. Thus, the excess over the required number was confirmed. The 1 kw output in this means that a temporal peak power in one pulse is 1 kW or more, and 1 kW or more at a wavelength of two-photon excitation. The photon density required in one pixel would be about $8192 \times 10^{12}/m^2$ or more, when the supercontinuum irradiation diameter is 1 µm and when the pixel square size is 1 µm (1 µm×1 µm), as described. In this case, when the number of photons obtained in the 1 µm irradiation diameter is 10112, the photon density would be about $12882 \times 10^{12}/m^2$, and thus the required photon density is achieved.

Though EGFP was adopted as an example in the above description, for many other fluorescent materials it is possible to know the required number of photons by an adequate calculation according to each condition of expression density, refractive index of clipping solution and quantum efficiency, and it is possible to know the output (peak power) of the supercontinuum source 4 in order that the number of photons exceeds it. Though detailed description is omitted, 1 kW or more enables irradiation of excitation light with the number of photons not less than the minimum number required for multiphoton-excited fluorescence observation for almost all kinds of biological samples, being preferable for multiphoton excitation observation of biological samples. The output exceeding 100 kW may damage biological samples in many cases. Therefore, the output from 1 to 100 kW is preferable as the supercontinuum source for multiphoton-excited fluorescence observation of biological samples.

In the above discussion on the required number of photons, though the required peak power was the peak power at the wavelength of excitation light, it is necessary that the temporal peak power provides the number of photons not less than the required minimum number in a certain wavelength range, because excitation light would be changed according to kinds of fluorescent molecules to observe. The following is a supplementary description on this.

Figure 8:
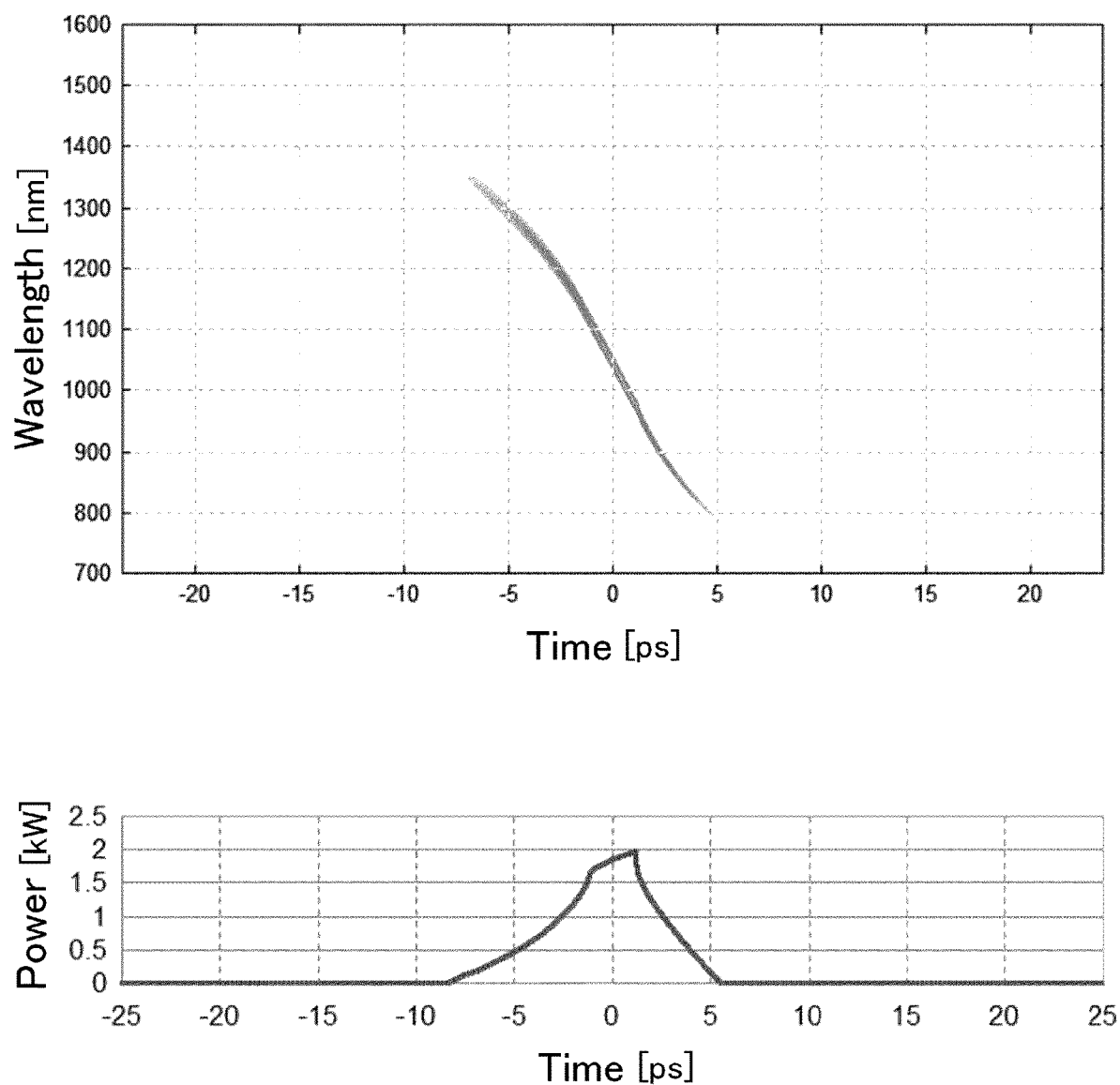
FIG. 8 is the figure showing a spectrogram of a supercontinuum emitted from the supercontinuum source in Example 1.
Figure 9:
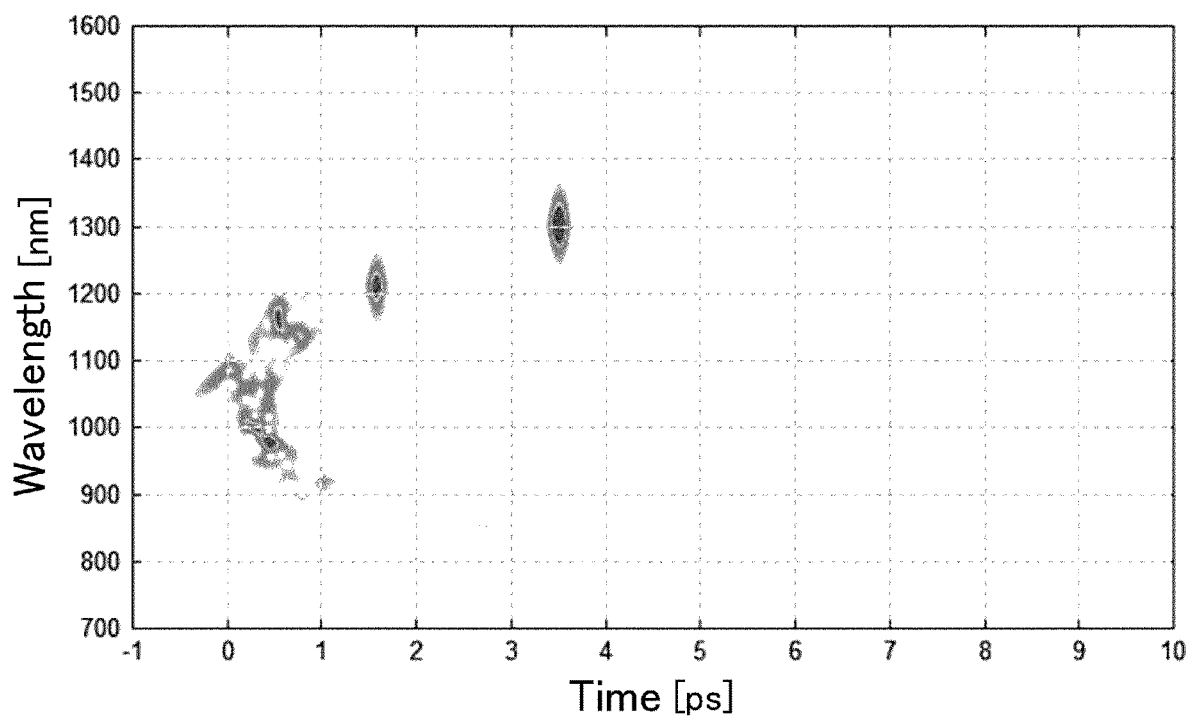
FIG. 9 is the figure showing a spectrogram of a supercontinuum emitted from the supercontinuum source in the referential example.
Figure 9:
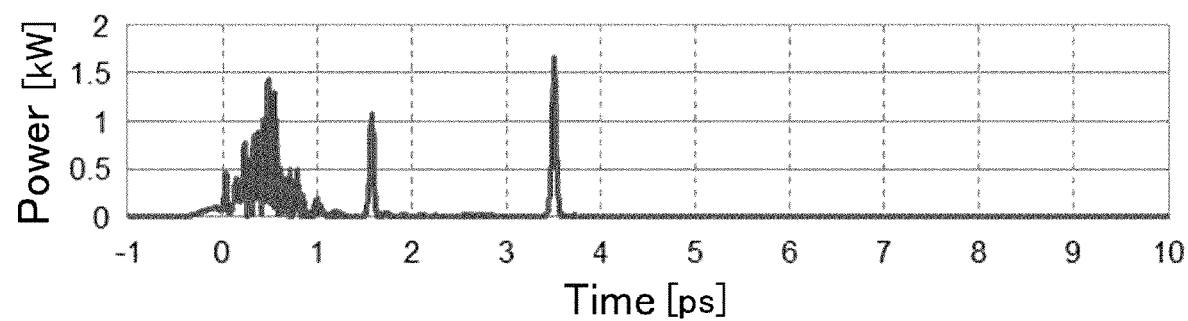

FIG. 8 and FIG. 9 are the figures showing the spectrograms of supercontinuums emitted from the supercontinuum source in Example 1 and the supercontinuum source in the referential example. FIG. 8 shows of Example 1, and FIG. 8 shows of the referential example. Though the intensities were expressed by color in the original spectrograms, those are shown in the lower areas in FIG. 8 and FIG. 9 respectively, because the figures are black-and-white.

As recognized in FIG. 8, the supercontinuum emitted from the supercontinuum source in Example 1 is at a longer wavelength initially in one pulse, and then the emission shifts to a shorter wavelength gradually and continuously as time passes, that is, having a spectrum continuous temporally as well. This example, which has the power of 1 kW or more within the range from about 850 to 1550 nm, is evaluated as preferable for multiphoton excitation fluorescence microscopes utilizing excitation light in this wavelength range.

By contrast, as shown in FIG. 9, the spectrum of the supercontinuum emitted from the supercontinuum source in the referential example is not continuous, that is, has a spectral vacancy, though the whole wavelength range is broadened. If a supercontinuum includes a spectral vacancy, it is not suitable for multiphoton excitation fluorescence microscopes, because a fluorescent molecule to be excited in the vacant band cannot be observed.

According to the multiphoton excitation fluorescence microscope in the described embodiment, even without a wavelength tuning mechanism, it is possible to carry out fluorescence observation as an object is excited by excitation light having a desired wavelength in a band width at least 200 nm included in the wavelength range from 850 to 1550 nm. This multiphoton excitation fluorescence microscope, therefore, has wider usability.

Though EGFP was adopted as fluorescent molecule in the above description, multiphoton-excited fluorescence observation is possible in the same manner for other kinds of natural or synthetic fluorescent molecules. The supercontinuum source 4 in the embodiment can be preferably used also for fluorescence observation where objects S are various kinds of materials other than biological samples. Processes utilizing multiphoton excitation other than fluorescence microscopy are known (e.g., measurement of multiphoton excitation spectra), and the supercontinuum source 4 in the embodiment also can be used for such other uses.

Figure 10:
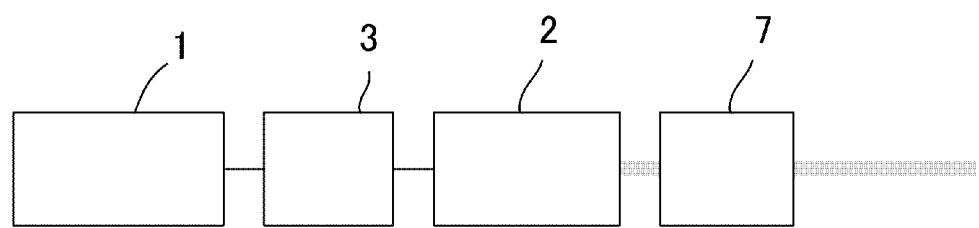
FIG. 10 is a schematic view of a supercontinuum source in a second embodiment.

The supercontinuum source in the second embodiment is described next. FIG. 10 is a schematic view of the supercontinuum source in the second embodiment.

Figure 11:
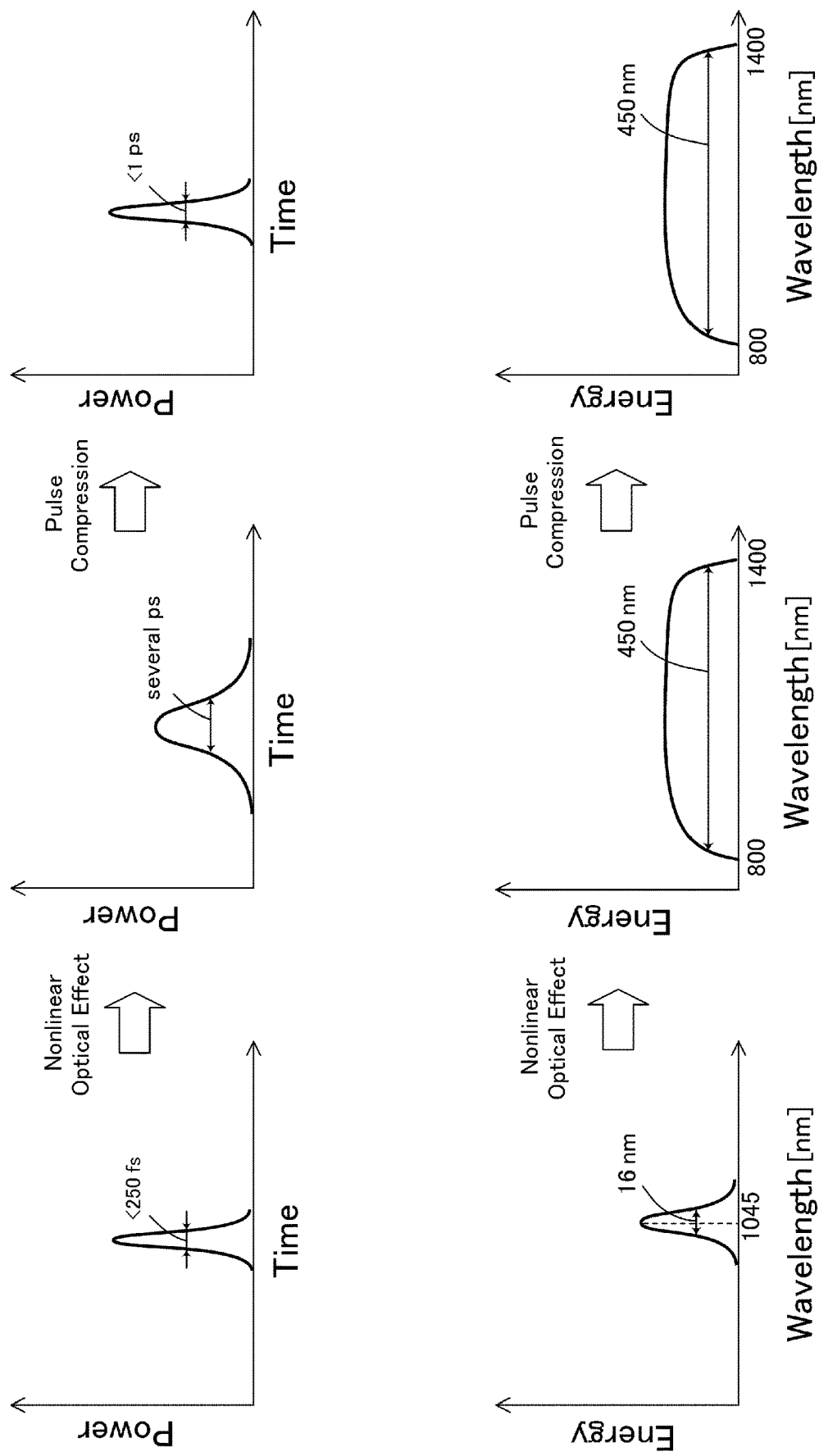
FIG. 11 is the figure schematically showing function and operation of the supercontinuum source in the second embodiment.

As understood in comparison of FIG. 1 and FIG. 10, the supercontinuum source in the second embodiment has the configuration where a pulse compressor 7 is provided on the emission side to the waveguide 2. FIG. 11 is the figure schematically showing function and operation of the supercontinuum source in the second embodiment. The upper part in FIG. 11 schematically shows how the pulse shape is transformed in the second embodiment, and the lower part schematically shows how the spectral profile is transformed.

In the second embodiment, as shown in FIG. 11, the output of the pulse oscillator is, for instance, less than 250 fs in the pulse width, 1045 nm in the center wavelength, and 16 nm or less in the FWHM (full width at the half maximum). This output is transformed into a supercontinuum having the pulse width of about 400-500 nm by utilizing self-phase modulation in a normal dispersion fiber. In this, the pulse width extends to about several picoseconds. The pulse compressor 7 compresses the pulses as broadness of the wavelength band width is maintained, and then makes the pulse width less than 1 ps.

Figure 12:
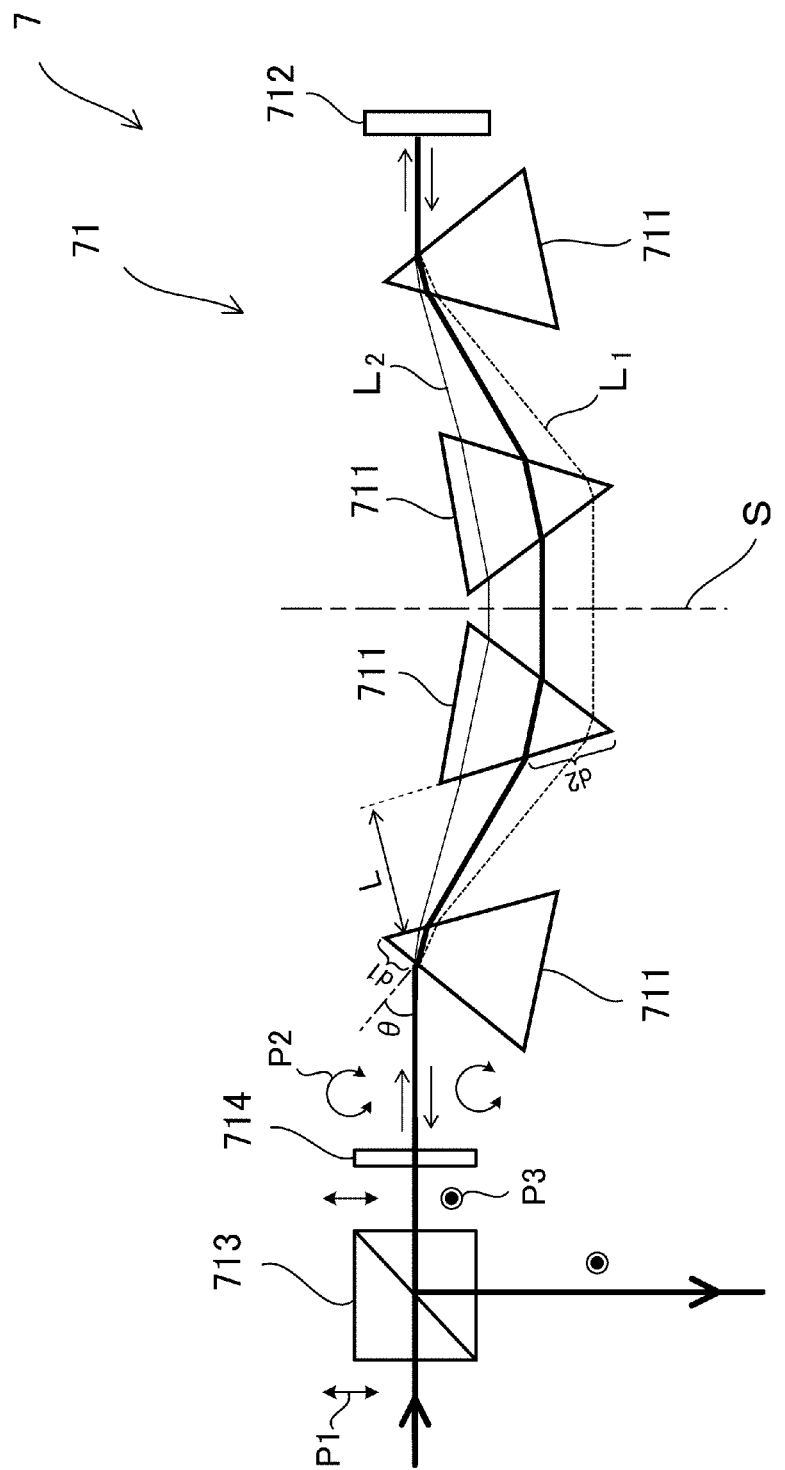
FIG. 12 is a schematic view of a pulse compressor used for the supercontinuum source in the second embodiment.

FIG. 12 is a schematic view of the pulse compressor 7 used for the supercontinuum source in the second embodiment. After reaching the concept of the supercontinuum source in the first embodiment, the inventors had the idea to add the pulse compressor 7. As described, the inventors intended to obtain a supercontinuum with the spectrum continuous in a band width of at least 200 nm in the wavelength range from 850 to 1550 nm so that it can be used preferably for multiphoton excitation fluorescence microscopes or other uses, and employed a nonlinear fiber with normal dispersion as one specific means to achieve this. By this, the spectrum of the supercontinuum is made flat and continuous in the wavelength band. As a result, the supercontinuum with the spectrum continuous also temporally is generated as shown in FIG. 8.

A light pulse having a spectrum continuous also temporally as shown in FIG. 8 is called "chirped pulse". To obtain a chirped pulse, usually an element with linear group-delay dispersion is used. By causing time lags corresponding to wavelength components originally existing in a pulse, a chirped pulse is obtained.

By contrast, the described first embodiment newly generates wavelength components not originally existing by nonlinear optical effects such as self-phase modulation, and then obtains a spectrum continuous and without spectral vacancy over a broader band width of 200 nm or more. In this, consequently the obtained spectrum is continuous also temporally as shown in FIG. 8. That is, a chirped pulse is obtained. The pulse shown in FIG. 8 can be called "linearly chirped pulse". Linear chirp means that wavelength continuously shifts with time. As shown in FIG. 8 is, furthermore, it is the chirped pulse having no extremal values (i.e., neither local maximums nor local minimums) in the wavelength shift.

Seeing the performance of the first embodiment, the inventors had the idea of applying pulse compression to the obtained supercontinuum. The reason of this is that pulse compression is more preferable for such a use as multiphoton excitation because peak power increases, and especially that it is easily applicable to such linearly chirped pulses as shown in FIG. 8.

In the second embodiment, more concretely, a prism-pair compressor 71 is used as the pulse compressor 7, as shown in FIG. 12. In this example, the compressor includes two pairs of (four in total) prisms 711.

In a supercontinuum emitted from the waveguide 2, a wave existing at an earlier time in one pulse has a longer wavelength, and another wave existing at a later time has a shorter wavelength, as shown in FIG. 8. That is, it undergoes a spectral shift to shorter wavelengths as time passes. Pulse compression is applied easily to such a chirped pulse by a dispersion element where GDD (group delay dispersion) increases linearly as wavelength increases. The prism pair compressor 71 in FIG. 12 is the element to carry out this kind of dispersion. A return mirror 712 is disposed to two pairs of prisms 711, and therefore a light beam passes through the prisms 711 eight times in total.

As shown in FIG. 12, each prism 711 is a triangular prism, extending along the direction perpendicular to the plane of FIG. 12. Two pairs of the prisms 711 are symmetric to a plane (shown with "S" in FIG. 12) perpendicular to the figure plane.

As shown in FIG. 12, a light wave $L_2$ at a longer wavelength has a longer overall propagation length through the four prisms 711, a light wave at a shorter wavelength has a shorter overall propagation length, and then the light wave $L_1$ at the shortest wavelength has the shortest one. Thus, a light wave at a longer wavelength is delayed more, whereas a light wave at a shorter wavelength is delayed less. When the size and the disposition interval of the prisms 711 are adequately chosen according to the refractive index of the material of the prisms 711, therefore, each wavelength in a pulse of the supercontinuum having returned after passing through the prisms 711 eight times would be temporally aligned (coherent), and thus the pulse is compressed.

The described excellent pulse compression property is due to the original characteristic of light, i.e., linear chirp. The linear chirp itself is due to the correspondence of the wavelengths, i.e., the correspondence of the center wavelength of ultrashort light pulses and the peak wavelength in the GVD spectrum of the normal dispersion fiber. Linear chirped pulses are obtained because the group velocity is dispersed uniformly to the shorter wavelength side and the longer wavelength side from the center wavelength of the ultrashort light pulses. According to the research by the inventors, the center wavelength of the ultrashort light pulses may be within ±50 nm from the peak wavelength in the GVD spectrum of the fiber with normal dispersion, in order to obtain linearly chirped pulses easily.

Showing a more specific design example of the prism pair compressor 71, dispersion at 1000 nm would be about −822 $fs^2$, when each prism 711 is made of quartz (refraction index 1.45 at the wavelength 1000 nm), the top angle of each prism 711 is 69.1°, the disposition interval (shown with "L" in FIG. 12) is 1 m, and d1+d2 as the light incident position is 10 cm. Because the center of the spectrum is approximately 1000 nm, the incident angle θ to the prisms 711 is the Brewster's angle at 1000 nm, i.e., 55.4°.

Figure 13:
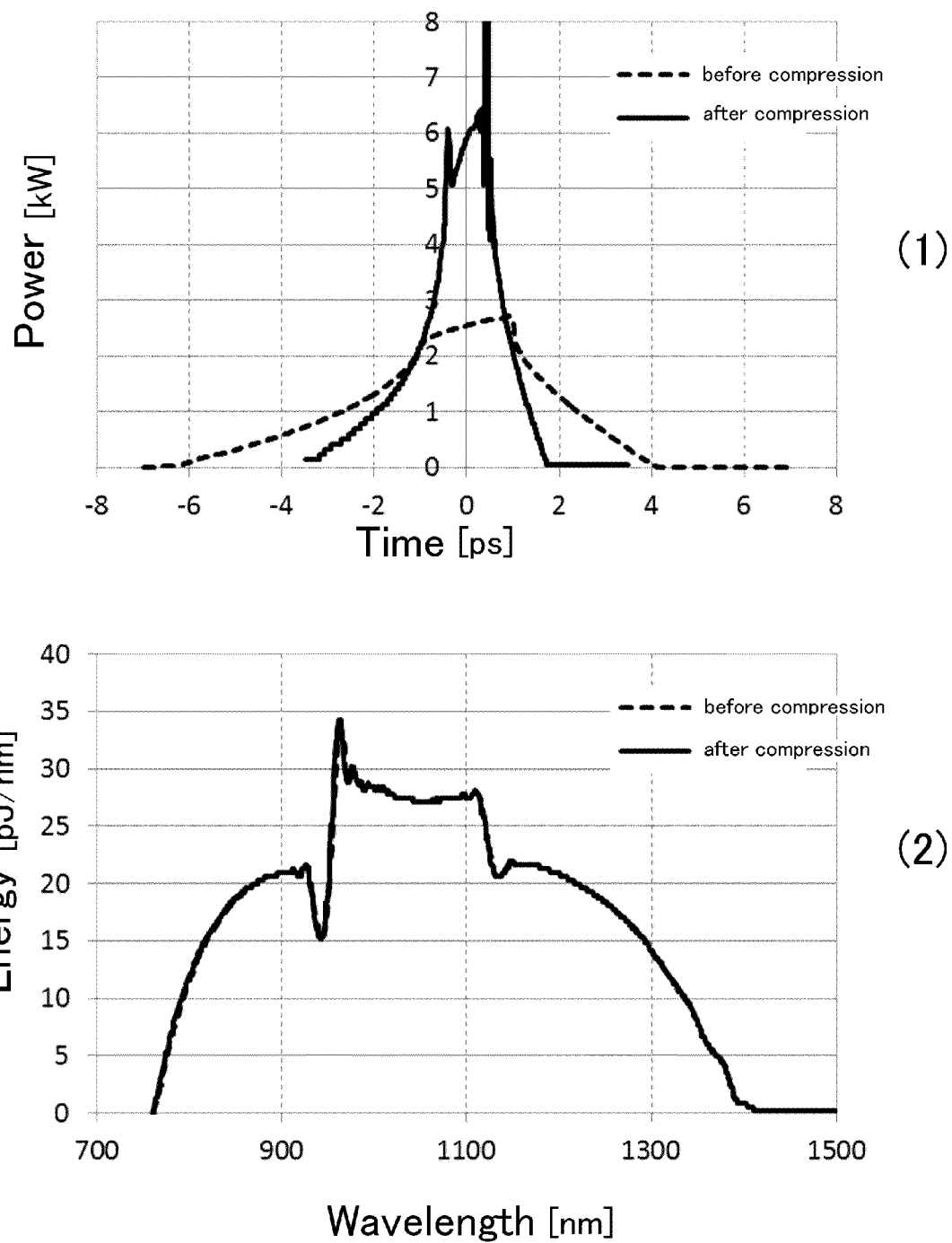
FIG. 13 is the figure showing the result of an experiment where increase of a peak power in the second embodiment was confirmed.

The peak power of the supercontinuum compressed as described would be higher, because the waves are overlapped within an extremely narrow time band. This situation is shown in FIG. 13. FIG. 13 is the figure showing the result of an experiment where an increase of the peak power in the second embodiment was confirmed.

In this the experiment, the supercontinuum shown in FIG. 8 was compressed with two pairs of prisms 711 as shown in FIG. 11. While FIG. 13(1) shows a couple of pulse shapes at the all wavelengths included, one before the compression is depicted with a dotted line (the same shape in the lower part of FIG. 8), and the other one after the compression is depicted with a solid line. While FIG. 13(2) shows a couple of the spectral distributions, one before the compression is depicted with a dotted line, and the other one after the compression is depicted with a solid line.

The horizontal axis in FIG. 13(1) is time (ps), and the vertical axis is power (kW). The horizontal axis in FIG. 13(2) is wavelength, and the vertical axis is energy (pJ/nm) normalized by wavelength, i.e., energy per wavelength.

As shown in FIG. 13(1), the supercontinuum is subjected to pulse compression as passes through the prism pair compressor 71. The FWHM of the pulse was about 1 ps after the compression, whereas it was about 4 ps before the compression. Then the peak power increases two times or more by the compression. Moreover, the dotted line and the solid line almost completely overlap in FIG. 13(2), showing almost no change of the spectral profile before and after the compression. That is, the spectral continuity over the range of about 850-1350 nm is maintained even after the compression.

Though FIG. 13(2), where the vertical axis is time-integrated energy (pJ), shows no change of time-integrated energy of light at each wavelength within the pulse, each instantaneous peak value at each wavelength has increased because the pulse width has been narrowed. Situation of the increase is similar as of the power in the whole wavelength range shown in FIG. 13(1).

Figure 14:
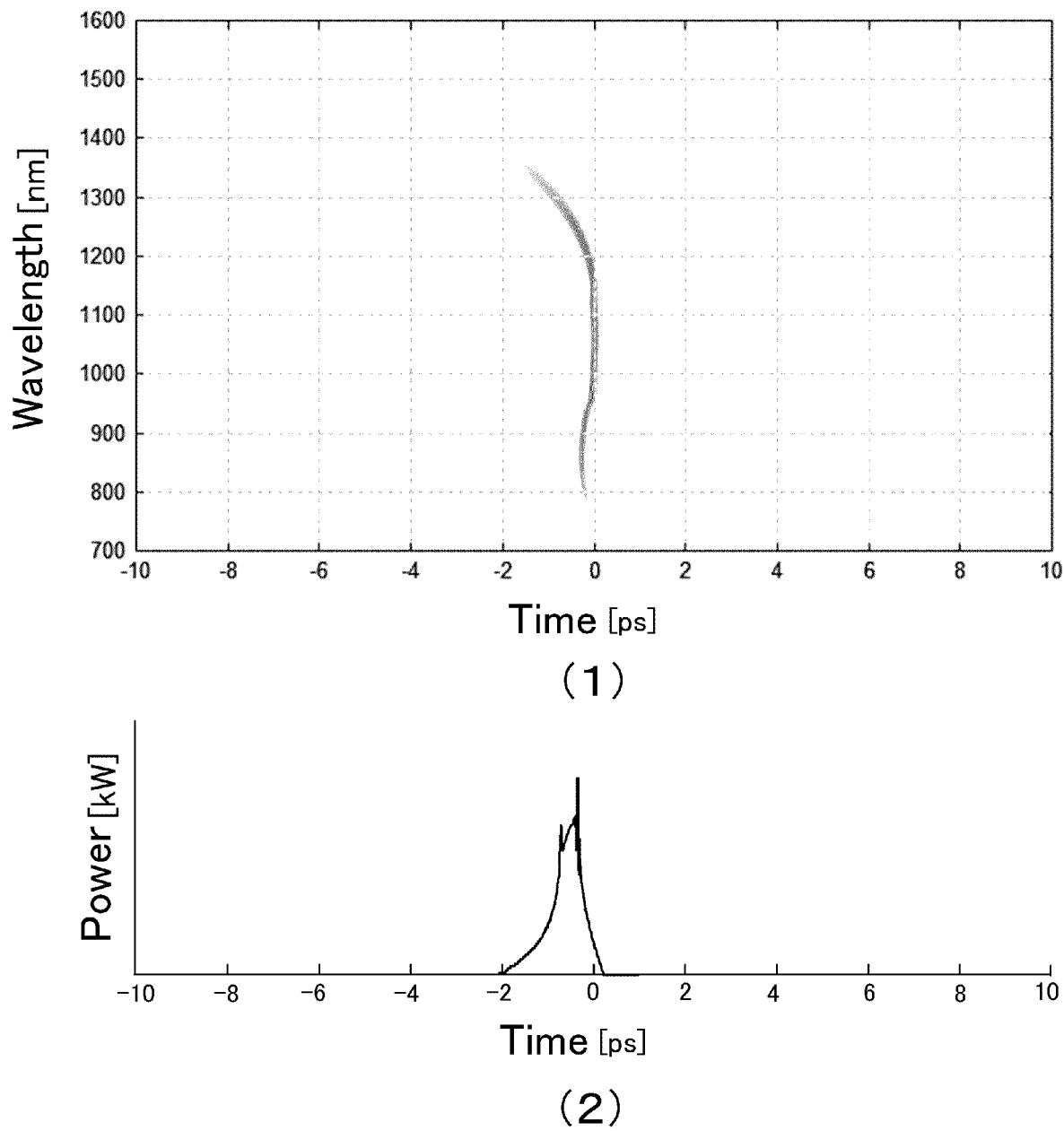
FIG. 14 is the figure showing the supercontinuum of FIG. 13 as a spectrogram.

FIG. 14 is the figure where the supercontinuum of FIG. 13 is shown as a spectrogram. Because the original is a color image, the pulse shape is shown in the lower area thereof as well as in FIG. 8.

As well understand by comparing FIG. 8 and FIG. 14, each wave at each wavelength overlaps at almost the same time by the pulse compression. The peak power increases greatly as a result of this overlapping.

As described, since the supercontinuum source in the second embodiment includes the pulse compressor 7 that compresses a supercontinuum emitted from the waveguide 2, the peak power is increased. Therefore, it is more preferable for such an application as multiphoton excitation fluorescence microscopy. That is, it can cause multiphoton excitation easily because of the higher peak power, and cause less damage to an object because of the narrower pulse width. It is necessary that many photons exist at the same time (or within a very narrow time band) for multiphoton excitation, and therefore the high peak power is advantageous. On the other hand, thermal damage to objects depends on irradiation dose, i.e., time-integrated amount of irradiation. Therefore, a light pulse with a narrow pulse width and high peak power is especially preferable in observing a low-heat-tolerance object, e.g., biological sample, by multiphoton excitation. For instance, it is possible to observe kinds of fluorescent proteins without color fading.

The supercontinuum source in the second embodiment needs a configuration to extract compressed light pluses from the optical path. From some possible solutions, a configuration using a polarization beam splitter 713 is adopted in the example shown in FIG. 12.

Concretely, the polarization beam splitter 713 is disposed on the optical path from the waveguide 2. A light beam emitted from the waveguide 2 enters the polarization beam splitter 713. A quarter-wavelength plate 714 is disposed between the polarization beam splitter 713 and the pulse compressor 7. As described, the supercontinuum source in the embodiment comprises the polarization control element 3 to emit a linearly polarized supercontinuum from the waveguide 2. If a supercontinuum emitted from the waveguide 2 is not linearly polarized, an adequate polarization control element is disposed between the waveguide 2 and the polarization beam splitter 713 to make it linearly polarized.

The supercontinuum P1 from the waveguide 2 passes through the polarization beam splitter 713, becomes the circular polarized light P2 on the quarter-wavelength plate 714, and returns to the quarter-wavelength plate 714 after being subjected to pulse compression by the prisms 711 as described. Then, it becomes the linearly polarized light P3, which polarization direction is 180° different, on the quarter-wavelength plate 714, and reaches the polarization beam splitter 713. Further, it is extracted from the optical path by a reflection in the polarization beam splitter 713, and then guided to a desired place to be utilized.

Figure 15:
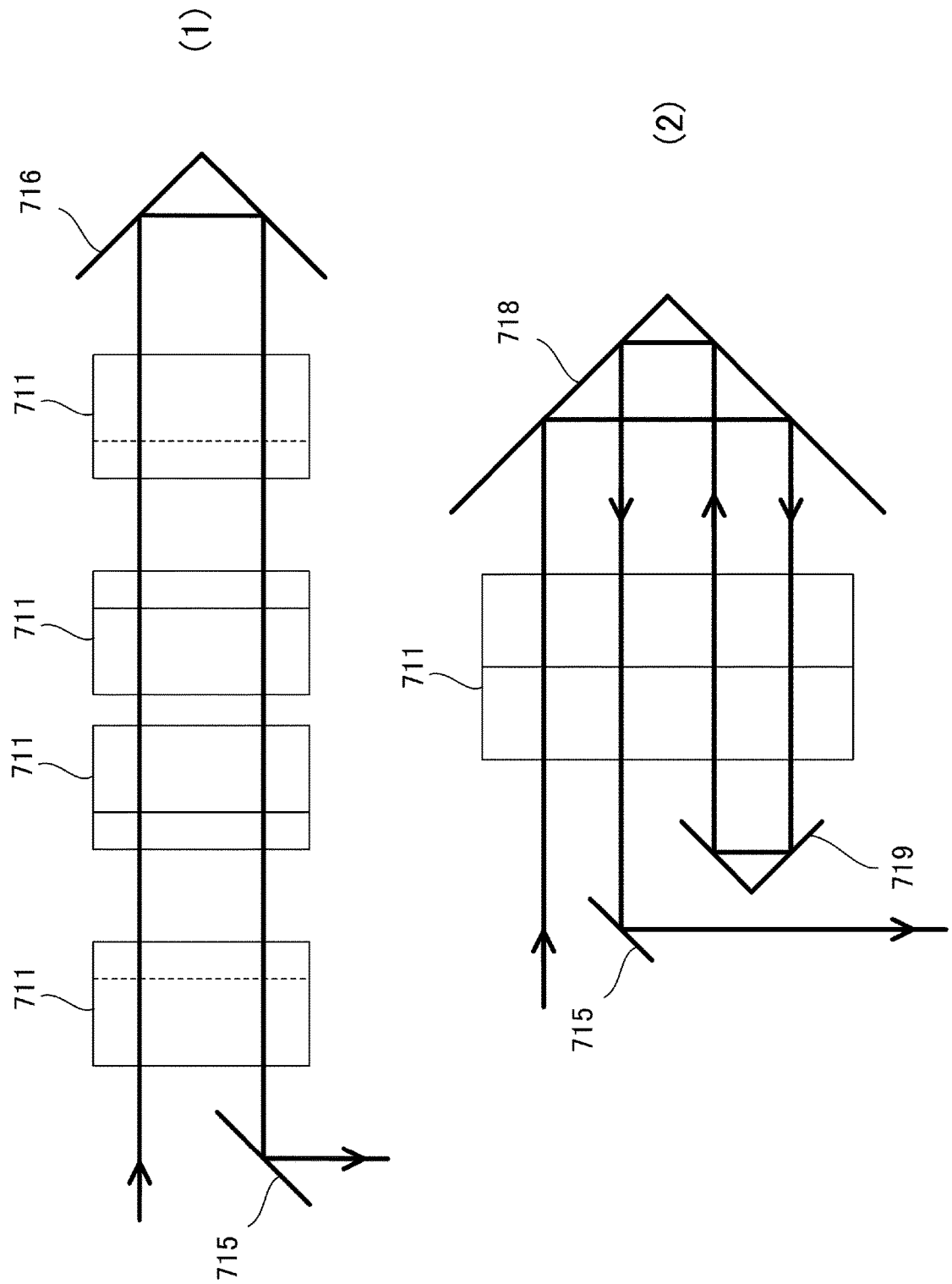
FIG. 15 is a schematic view showing other configuration examples for light extraction.

Instead of the configuration to extract a supercontinuum by the polarization beam splitter 713, the supercontinuum source may often have a configuration of oblique optical paths, otherwise a configuration to use a retroreflector. These are described with reference to FIG. 15. FIG. 15 is a schematic view showing other examples of configurations for light extraction.

FIG. 15(1) shows an example employing a retroreflector 716. The retroreflector 716 is used instead of the return mirror 712 in FIG. 12. In employing the retroreflector 716, an outgoing path and return path are designed so as to deviate from each other in the length direction of each prism 711. In this case as well, an extraction mirror 715 is disposed at the exit of the return path to extract a pulse-compressed supercontinuum.

FIG. 15(2) is another example of the pulse compressor 7 that is made small-sized by employing two retroreflectors 718, 719. A supercontinuum from the waveguide 2 is refracted through the prism 111, returns by reflections on the first retroreflector 718, and then passes through the prism 711 again. It further returns to the prism 711 by reflections on the second retroreflector 719, and passes through the prism 711 once again after reflections on the first retroreflector 718. It finally reflects on the extraction mirror 715 to be extracted. This configuration, which is equal to use of two prisms (one prism pair) for outgoing and return of light, is small sized as a whole.

Alternatively, it may be possible to provide a slight inclination angle between the outgoing path and return path in the prism pair compressor 7 of FIG. 12, though it is not shown in a figure. In this configuration, the inclination angle is adequately chosen according to the beam diameter and the optical path length of the supercontinuum so that the pulse-compressed supercontinuum can return to a different position, at which an extraction mirror is disposed to extract it.

If a light beam from the waveguide 2 is not linearly polarized, the configuration using the polarization beam splitter 713 shown in FIG. 12 needs a polarizer to linearly polarize. This could cause a loss. By contrast, the configuration of FIG. 15(1)(2) and the configuration providing the inclination angle are preferable because of no such a loss.

Figure 16:
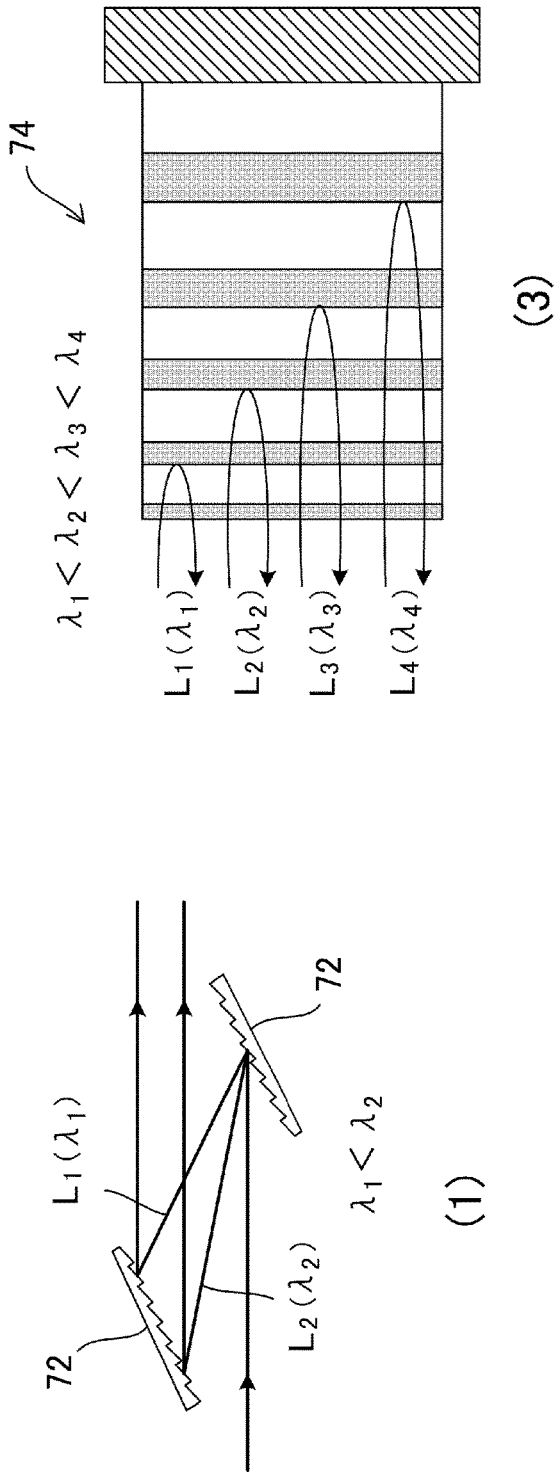
FIG. 16 is a schematic view showing another configuration for the pulse compressor.

Other examples of the pulse compressor 7 are described next. Though the prism pair compressor 71 was used as the pulse compressor 7 in the second embodiment, other kinds of compression means are also usable. FIG. 16 shows another example of the pulse compressor 7.

As shown in FIG. 16(1), a pair of gratings (diffraction gratings) 72 may be used for the pulse compressor 7. In the supercontinuum pulse shown in FIG. 16(1), the shorter wavelength wave $L_1$ having generated at a later time point has the longer path length to the emission end of the grating pair 72, compared with the longer wavelength wave $L_2$ having generated at an earlier time point. Therefore, disposition of each grating 72 with adequately-chosen tilt angles relating to the center wavelength of the supercontinuum can make each wave temporally aligned (coherent), establishing the pulse compression.

Grating pairs are preferable for compression of a wideband supercontinuum as in the embodiment because dispersion is possible for wider wavelength bands. Still it has a problem in efficiency. Whereas the blaze angle is chosen according to the center wavelength of a supercontinuum in using a grating pair, diffraction loss may occur with deviation from the blaze angle. Namely, such a loss as decrease of the power with deviation from the center wavelength in the spectral power distribution may occur. As a result, it could happen that the wavelength range including the peak power capable of multiphoton excitation could be narrower, compared with the configuration using a prism pair.

As shown in FIG. 16(2), alternatively, a grism 73 also may be used as the pulse compressor 7. The grism 73 has the structure where a comb grating 732 is disposed between a couple of prisms 731,731 arranged plane-symmetrically. The couple of prisms 731 provides the optical path length difference according to wavelength as well as the prism pair, and has the function of compensating the dispersion (spatial dispersion) by the comb grating 732.

The configuration using the grism has the advantage of being smaller in size, compared with the grating pair. The problem of the diffraction loss, however, remains because a grating is still used.

As shown in FIG. 16(3), alternatively, a chirped mirror 74 may be used as the pulse compressor 7. The chirped mirror 74, which includes a multilayer film formed on a substrate to reflect light, extends the optical path length, because a light wave at a longer wavelength reflects at a deer layer within the multilayer film.

Generally one chirped mirror only has group-delay dispersion as small as about −50 fs$^2$, though pulse compression can be performed comparatively easier. Accordingly, the reflection has to be repeated, for instance, 200 times or more to use a chirped mirror as the pulse compressor 7 in this embodiment. Though the chirped mirror can have high reflection rate, it has the disadvantage that the loss increases as a whole, if the reflection is repeated such many times.

As shown in FIG. 16(4), alternatively, an SLM (spatial light modulator) 75 may be used as the pulse compressor 7. The SLM 75, which is the element having an array of a lot of pixels where refraction indexes are independently controlled as well as liquid crystal displays, is capable of secondary or other high-order dispersion compensation according to an applied voltage. Transparent type and reflection type are known as SLM. A reflection type one, for instance, is adopted for pulse compression in the configuration where a supercontinuum is spatially dispersed on the grating 751, converted into the collimated light beam by a lens 752, and then enters into each pixel, as shown in FIG. 16(4). The SLM 75 has the advantages that waves in a desired wavelength band can be selectively delayed (group delayed), and that high-order dispersion compensations are also possible. In general, group delay in one-time reflection is about from several tens to two hundreds fs$^2$. For pulse compression in this embodiment, therefore, it is preferable to use it additionally for particularly selected wavelengths requiring group delay dispersion or high-order dispersion compensation. That is, it is preferable to use it for a final adjustment.

Figure 17:
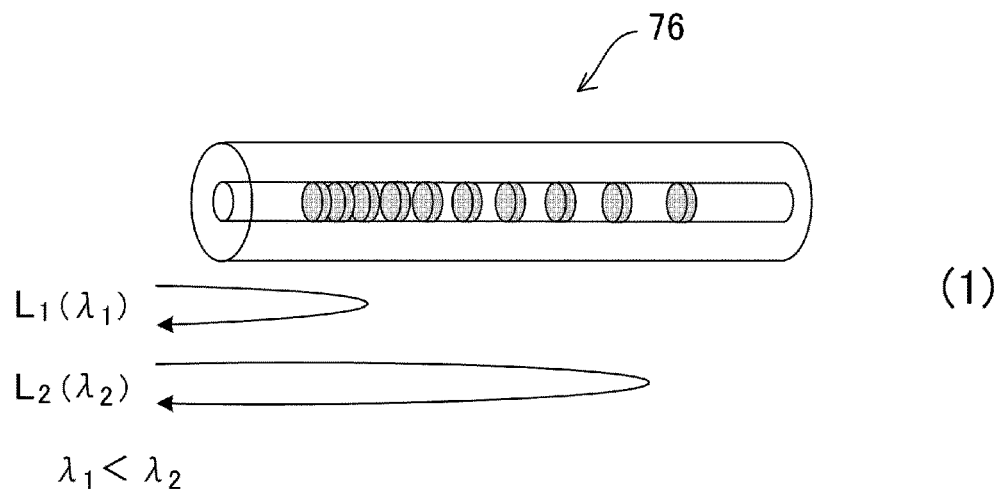
FIG. 17 is a schematic view showing a further configuration for the pulse compressor.
Figure 17:
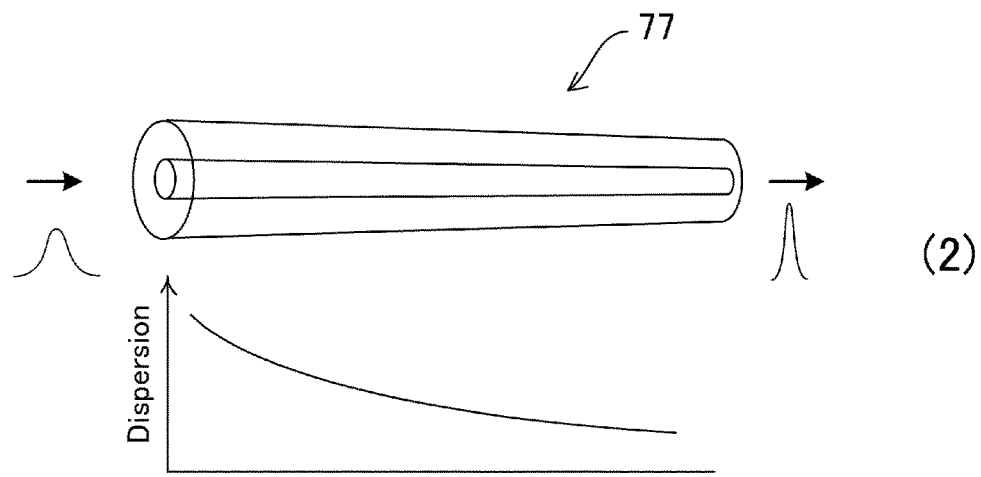
Figure 17:
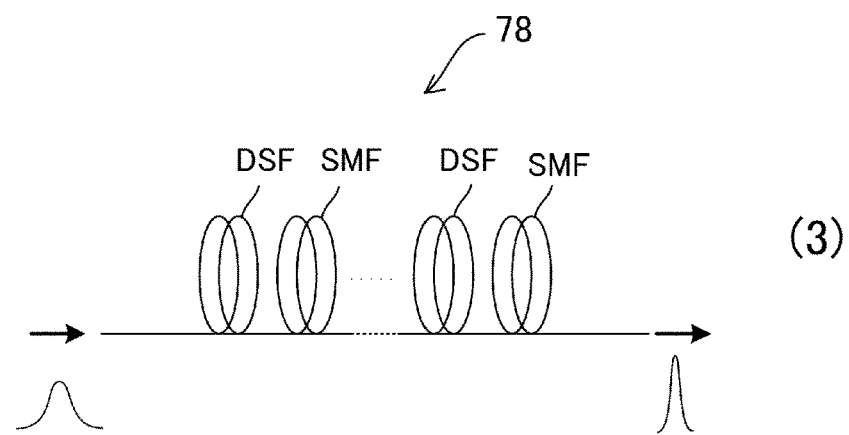

A fiber having a specific structure or function may be used as the pulse compressor 7 in the supercontinuum source in the embodiment. This point is described next with reference to FIG. 17. FIG. 17 is a schematic view showing a further example of the pulse compressor 7.

A quite simple example using a fiber as the pulse compressor 7 is one using an anomalous dispersion fiber. Because a longer-wavelength wave is delayed more in an anomalous dispersion fiber, pulse compression is enabled by making a supercontinuum propagate through an anomalous fiber having an adequate GVD and length.

As shown in FIG. 17(1), alternatively, a chirped fiber Bragg grating (CFBG) can be used as the pulse compressor 7. CFBGs are fibers where portions having periodically-different refractive indexes are provided in cores along the length directions, functioning as diffraction gratings. Among these, it can be said that the CFBG 76 is the element where the reflection position varies according to wavelength in order to achieve the chirped mirror function in the fiber. The CFBG 76 has the characteristic where a shorter-wavelength wave of incident light reflects at a front position to return in the propagation direction, and a longer-wavelength wave reflects at a deeper position to return.

As shown in FIG. 17(2), alternatively, a dispersion decreasing fiber 77 may be used as the pulse compressor 7 to carry out adiabatic soliton compression. The dispersion decreasing fiber 77 has the characteristic where dispersion decreases gradually as light propagates. The dispersion decreasing fiber 77 has the structure where, for instance, both of the core diameter and the clad diameter decrease to the light propagation direction. Fundamental soliton is the stable state where anomalous dispersion and self-phase modulation are in balance in a fiber. Use of the dispersion decreasing fiber 77 enables pulse compression as a fundamental soliton is maintained, because the fundamental soliton condition can be changed continuously according to the distance. The adiabatic soliton compression has the advantages of high compression rate and superior sech-type pulse quality.

As shown in FIG. 17(3), alternatively, a comb-like dispersion profiled fiber 78 may be used as the pulse compressor 7. Comb-like dispersion profiled fibers are fibers where dispersion shift fibers (DSF) and single mode fibers (SMF) are arranged alternately. The comb-like dispersion profiled fiber 78 has the advantage that required compression characteristics are easily realized by commercially available fibers, though it has the problem of the loss due to many connections therein.

As described, the supercontinuum source in the embodiment uses the nonlinear fiber the as the waveguide 2. Use of a fiber as the pulse compressor 7 has the merit that affinity among the elements is enhanced, and thus handlings and adjustments are made easier, because generation and compression of a supercontinuum can be completed within the fiber system.

Still, when a fiber is used for pulse compression, attention must be paid so that no undesired high-order nonlinear effects can occur by incidence of a high energy supercontinuum. Nevertheless once a flat supercontinuum has been generated successfully over a wide band, a further nonlinear optical effect could occur in pulse compression, causing vacant bands, extreme drops, etc. in the spectrum. This should be avoided. In this respect, such group delay dispersion elements as prism pair, grating, grism and chirped mirror are preferable because those are kinds of spatial elements, being capable of enlarging beam diameters freely, whereas beam diameters for fibers are only micrometer order. Such spatial elements are also preferable in designing because nonlinear optical effects hardly occur.

Use of a fiber needs caution for its thermal damage by self-convergence or the like, because peak power increases by pulse compression. To prevent fiber damage it is effective to adopt a large mode area (LMA) fiber or hollow-core photonic bandgap fiber (PBF). Those are also effective to prevent spectral distortion that could be caused by an undesired nonlinear optical effect.

LMA photonic crystal fibers (LMA-PCF) capable of single mode propagation in wide bands are already commercially available. Though currently there is no LMA-PCF with anomalous dispersion in the whole wavelength range for the present invention, it may be used if developed. Though hollow core PBFs have the feature of essentially no optical nonlinearity due to its hollow core structure, those which are commercially available are all low dispersion fibers. In case one providing sufficient dispersion is developed, however, it may be used as well.

EXPLANATION OF SIGNS

1 Pulse Oscillator
2 Waveguide
3 Polarization Control Element
4 Supercontinuum Source
5 Optical System
51 Lens
52 Dichroic Mirror
53 Scanning Mirror Unit
531 Scanning Mirror 54 Objective Lens
6 Detector
61 Imaging Device
62 Filter
7 Pulse Compressor
71 Prism Pair Compressor
711 Prism
712 Return Mirror
713 Polarization Beam Splitter
714 Quarter Wavelength Plate
72 Grating
73 Grism
74 Chirped Mirror
75 Spatial Light Modulator
76 CFBG
77 Dispersion Decreasing Fiber
78 Comb-like Dispersion Profiled Fiber

What is claimed:

1. A supercontinuum source to generate and emit a supercontinuum, comprising:
a pulse oscillator oscillating an ultrashort light pulse, and
a waveguide converting the oscillated ultrashort light pulse from the pulse oscillator into a supercontinuum by a nonlinear optical effect, and then emitting, wherein
the waveguide has a conversion characteristic where the ultrashort light pulse is converted into the supercontinuum having a spectrum continuous in a wavelength band width of at least 200 nm included in the wavelength range from 850 to 1550 nm and having a wavelength flatness within 3 dB in the wavelength band width of at least 200 nm included in the wavelength range from 850 to 1550 nm,
the pulse oscillator and the waveguide are operable to emit the supercontinuum with a peak power within 1 to 100 kW enabling multiphoton excitation of an object on an irradiated plane, and
the ultrashort light pulse has a pulse width not more than 1 ps and a center wavelength in the wavelength range from 1000 to 1100 nm.

2. The supercontinuum source as claimed in claim 1, wherein the waveguide has the conversion characteristic where the temporal shift of wavelength of the supercontinuum is continuous in one pulse.

3. The supercontinuum source as claimed in claim 1, wherein the waveguide is a fiber with normal dispersion in the wavelength range from 850 to 1550 nm.

4. The supercontinuum source as claimed in claim 3, wherein the center wavelength of the ultrashort light pulse is in the range of plus and minus 50 nm to the peak wavelength of the group velocity dispersion spectrum of the fiber with normal dispersion.

5. The supercontinuum source as claimed in claim 1, further comprising a pulse compressor to increase the peak power of the supercontinuum by compressing the supercontinuum emitted from the waveguide.

6. The supercontinuum source as claimed in claim 2, further comprising a pulse compressor to increase the peak power of the supercontinuum by compressing the supercontinuum emitted from the waveguide.

7. A method for generating and emitting a supercontinuum, comprising:
oscillating an ultrashort light pulse by a pulse oscillator,
making the ultrashort light pulse from the pulse oscillator enter into a waveguide, and
converting the ultrashort light pulse into a supercontinuum by a nonlinear optical effect in the waveguide, and then emitting therefrom,
wherein
the waveguide converts the ultrashort light pulse into the supercontinuum having a spectrum continuous in a band width of at least 200 nm included in the wavelength range from 850 to 1550 nm and having a wavelength flatness within 3 dB in the wavelength band width of at least 200 nm included in the wavelength range from 850 to 1550 nm, and
the ultrashort light pulse oscillated from the pulse oscillator has a pulse width not more than 1 ps and the center wavelength in the wavelength range from 1000 nm to 1100 nm, and
further comprising emitting the supercontinuum with a peak power within 1 to 100 kW to enable multiphoton excitation of an object on an irradiated plane.

8. The method for generating and emitting a supercontinuum as claimed in claim 7, wherein the waveguide converts the ultrashort light pulse into the supercontinuum where the temporal shift of wavelength is continuous.

9. The method for generating and emitting a supercontinuum as claimed in claim 7, wherein the waveguide is a fiber with normal dispersion in the wavelength range from 850 to 1550 nm.

10. The method for generating and emitting a supercontinuum as claimed in claim 9, wherein the center wavelength of the ultrashort light pulse is in the range of plus and minus 50 nm to the peak wavelength of the group velocity dispersion spectrum of the fiber with normal dispersion.

11. The method for generating and emitting a supercontinuum as claimed in claim 7, further comprising increasing the peak power of the supercontinuum emitted from the waveguide by pulse compression thereof.

12. The method for generating and emitting a supercontinuum as claimed in claim 8, further comprising increasing the peak power of the supercontinuum emitted from the waveguide by pulse compression thereof.

13. A multiphoton excitation fluorescence microscope comprising the supercontinuum source as claimed in claim 1, further comprising
an optical system to irradiate an object with the supercontinuum emitted from the waveguide, and
a detector to detect a fluorescence emitted when the object is subjected to multiphoton excitation by the supercontinuum.

14. The supercontinuum source as claimed in claim 5, wherein the pulse compressor is a prism pair compressor comprising a pair of prisms where a light wave at a longer wavelength has a longer overall propagation length.

15. The supercontinuum source as claimed in claim 5, wherein the pulse compressor is a prism pair compressor comprising plural pairs of prisms where a light wave at a longer wavelength has a longer overall propagation length,
further comprising a mirror at a position where the supercontinuum from the pairs of the prisms is returned thereto, making the supercontinuum pass through the pairs of the prisms plural times.

16. The supercontinuum source as claimed in claim 6, wherein the pulse compressor is a prism pair compressor comprising plural pairs of prisms where a light wave at a longer wavelength has a longer overall propagation length,
further comprising a mirror at a position where the supercontinuum from the pairs of the prisms is returned thereto, making the supercontinuum pass through the pairs of the prisms plural times.

* * * * *